(12) United States Patent
Smith, Jr.

(10) Patent No.: US 10,934,472 B2
(45) Date of Patent: Mar. 2, 2021

(54) COMPOSITIONS COMPRISING NON-HALOGENATED SOLVENTS FOR USE IN OIL AND/OR GAS WELLS AND RELATED METHODS

(71) Applicant: Flotek Chemistry, LLC, Houston, TX (US)

(72) Inventor: Richard Harlen Smith, Jr., Spring, TX (US)

(73) Assignee: Flotek Chemistry, LLC, Houston, TX (US)

( * ) Notice: Subject to any disclaimer, the term of this patent is extended or adjusted under 35 U.S.C. 154(b) by 0 days.

(21) Appl. No.: 15/680,454

(22) Filed: Aug. 18, 2017

(65) Prior Publication Data

US 2019/0055457 A1 Feb. 21, 2019

(51) Int. Cl.
C09K 8/524 (2006.01)

(52) U.S. Cl.
CPC .................... C09K 8/524 (2013.01)

(58) Field of Classification Search
CPC ........ E21B 43/267; E21B 43/26; E21B 43/04; E21B 33/13; E21B 33/138; E21B 43/025; E21B 43/25; C09K 8/805; C09K 8/92; C09K 8/035; C09K 8/56; C09K 8/70; C09K 8/80; C09K 2208/08; C09K 2208/24; C09K 2208/26; C09K 2208/32; C09K 8/03; C09K 8/42; C09K 8/426; C09K 8/516; C09K 8/536; C09K 8/565; C09K 8/62; C09K 2208/02; C09K 3/18; C09K 3/185; C09K 5/10; C09K 5/20; C09K 8/44; C09K 8/50; C09K 8/52; C09K 8/575; C09K 8/524
See application file for complete search history.

(56) References Cited

U.S. PATENT DOCUMENTS

| | | |
|---|---|---|
| 3,047,062 A | 7/1962 | Meadors |
| 3,060,210 A | 10/1962 | De Groote |
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,243 A | 11/1974 | Allen et al. |
| 3,850,248 A | 11/1974 | Carney |
| 3,878,892 A | 4/1975 | Allen et al. |
| 3,919,411 A | 11/1975 | Glass et al. |
| 4,005,020 A | 1/1977 | McCormick |
| 4,022,278 A | 5/1977 | Allen |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,662,449 A | 5/1987 | Friedman |
| 4,759,913 A | 7/1988 | Headington |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,556,832 A | 9/1996 | Van Slyke |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,612,303 A | 3/1997 | Takayanagi et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |

(Continued)

FOREIGN PATENT DOCUMENTS

| | | |
|---|---|---|
| CN | 102127414 A | 7/2011 |
| CN | 102277143 B | 3/2013 |

(Continued)

OTHER PUBLICATIONS

Boateng, et. al., Coconut oil and palm oil's role in nutrition, health and national development: A review, Ghana Med J 2016; 50(3): 189-196.*

(Continued)

*Primary Examiner* — Kumar R Bhushan
(74) *Attorney, Agent, or Firm* — Wolf, Greenfield & Sacks, P.C.

(57) ABSTRACT

Compositions comprising non-halogenated solvents for use in various aspects of a life cycle of an oil and/or gas well, and related methods, are provided. In some embodiments, the composition comprises a solvent blend and one or more surfactants. In some embodiments, the solvent blend comprises a first type of solvent (e.g., a terpene) and a second type of solvent (e.g., a non-halogenated solvent). The composition may comprise about 90 wt % to 99.9 wt % of the solvent blend, and about 0.1 wt % to 10 wt % of one or more surfactants, versus the total weight of the composition. In some embodiments, compositions can be used in methods for treating an oil and/or gas well, having a wellbore that comprises one or more fluids. A composition may be delivered into the wellbore, passing through the one or more fluids to reduce residues comprising asphaltenes, paraffins or combinations thereof on or near the wellbore.

31 Claims, No Drawings

(56) References Cited

U.S. PATENT DOCUMENTS

| | | |
|---|---|---|
| 5,830,831 A | 11/1998 | Chan et al. |
| 5,863,881 A | 1/1999 | Vlasblom |
| 5,874,386 A | 2/1999 | Chan et al. |
| 5,923,930 A | 7/1999 | Tsukamoto et al. |
| 5,925,233 A | 7/1999 | Miller et al. |
| 5,975,206 A | 11/1999 | Woo et al. |
| 5,977,032 A | 11/1999 | Chan |
| 5,985,816 A | 11/1999 | Vlasblom |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,090,769 A | 7/2000 | Vlasblom |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,797,684 B2 | 9/2004 | Henneberry et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | Vonkrosigk et al. |
| 7,021,378 B2 | 4/2006 | Prukop |
| 7,122,509 B2 | 10/2006 | Sanner et al. |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,101,812 B2 | 1/2012 | Fan et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 8,916,508 B2 | 12/2014 | Parnell et al. |
| 9,062,241 B2 | 6/2015 | Zamora et al. |
| 9,068,108 B2 | 6/2015 | Hill et al. |
| 9,200,192 B2 | 12/2015 | Zelenev et al. |
| 9,222,013 B1 | 12/2015 | Champagne et al. |
| 9,321,955 B2 | 4/2016 | Hill et al. |
| 9,428,683 B2 | 8/2016 | Hill et al. |
| 9,464,223 B2 | 10/2016 | Champagne et al. |
| 9,505,970 B2 | 11/2016 | Vaughn et al. |
| 9,790,414 B2 | 10/2017 | Champagne et al. |
| 9,809,741 B2 | 11/2017 | Hill et al. |
| 9,850,418 B2 | 12/2017 | Champagne et al. |
| 9,868,893 B2 | 1/2018 | Saboowala et al. |
| 9,884,988 B2 | 2/2018 | Dismuke et al. |
| 9,890,624 B2 | 2/2018 | Portwood |
| 9,890,625 B2 | 2/2018 | Portwood |
| 9,951,264 B2 | 4/2018 | Penny et al. |
| 9,957,779 B2 | 5/2018 | Fursdon-Welsh et al. |
| 9,994,762 B2 | 6/2018 | Hill et al. |
| 10,000,693 B2 | 6/2018 | Hill et al. |
| 10,005,948 B2 | 6/2018 | Champagne et al. |
| 10,053,619 B2 | 8/2018 | Saboowala et al. |
| 10,087,361 B2 | 10/2018 | Hill et al. |
| 10,144,862 B2 | 12/2018 | Zelenev et al. |

(56) References Cited

U.S. PATENT DOCUMENTS

| | | |
|---|---|---|
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0079879 A1* | 5/2003 | Grainger ............... C09K 8/524 166/304 |
| 2003/0232095 A1 | 12/2003 | Garti et al. |
| 2004/0047655 A1 | 3/2004 | No et al. |
| 2005/0197267 A1* | 9/2005 | Zaki ...................... C11D 1/526 510/245 |
| 2006/0014648 A1 | 1/2006 | Milson et al. |
| 2006/0211593 A1 | 9/2006 | Smith et al. |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0270157 A1 | 10/2013 | Ferrara |
| 2013/0291323 A1 | 11/2013 | Heilian et al. |
| 2013/0292121 A1 | 11/2013 | Penny et al. |
| 2013/0345098 A1 | 12/2013 | Morris et al. |
| 2014/0005079 A1 | 1/2014 | Dahanayake et al. |
| 2014/0060831 A1 | 3/2014 | Miller et al. |
| 2014/0110344 A1 | 4/2014 | Hoag et al. |
| 2014/0166285 A1 | 6/2014 | Santra et al. |
| 2014/0202700 A1 | 7/2014 | Blair |
| 2014/0262261 A1 | 9/2014 | Hill et al. |
| 2014/0262274 A1 | 9/2014 | Dismuke et al. |
| 2014/0262288 A1 | 9/2014 | Penny et al. |
| 2014/0274822 A1 | 9/2014 | Dismuke et al. |
| 2014/0284053 A1 | 9/2014 | Germack |
| 2014/0332212 A1 | 11/2014 | Ayers et al. |
| 2014/0371115 A1 | 12/2014 | Hill et al. |
| 2015/0034866 A1 | 2/2015 | Weakley et al. |
| 2015/0053404 A1 | 2/2015 | Penny et al. |
| 2015/0080265 A1 | 3/2015 | Elzinga et al. |
| 2015/0105302 A1 | 4/2015 | Pursley et al. |
| 2015/0218490 A1 | 8/2015 | De Wit et al. |
| 2015/0247082 A1 | 9/2015 | Rea |
| 2015/0247381 A1 | 9/2015 | Pursley |
| 2015/0315097 A9 | 11/2015 | Harvey et al. |
| 2016/0003018 A1 | 1/2016 | Saboowala et al. |
| 2016/0017204 A1 | 1/2016 | Hill et al. |
| 2016/0024890 A1 | 1/2016 | Fursdon-Welsh et al. |
| 2016/0032172 A1 | 2/2016 | Pursley et al. |
| 2016/0075934 A1 | 3/2016 | Champagne et al. |
| 2016/0194550 A1 | 7/2016 | Hill et al. |
| 2016/0257911 A1 | 9/2016 | Denison et al. |
| 2016/0312106 A1 | 10/2016 | Penny et al. |
| 2017/0166801 A1* | 6/2017 | Socci ...................... C09K 8/52 |
| 2017/0275518 A1 | 9/2017 | Trabelsi et al. |
| 2017/0313925 A1 | 11/2017 | Dismuke et al. |
| 2017/0368560 A1 | 12/2017 | McElhany et al. |
| 2018/0037792 A1 | 2/2018 | Champagne et al. |
| 2018/0134941 A1 | 5/2018 | Saboowala et al. |
| 2018/0171213 A1 | 6/2018 | Hill et al. |
| 2018/0282611 A1 | 10/2018 | Hill et al. |
| 2018/0305601 A1 | 10/2018 | Champagne et al. |
| 2019/0055458 A1 | 2/2019 | Smith, Jr. et al. |
| 2019/0055459 A1 | 2/2019 | Zelenev et al. |

FOREIGN PATENT DOCUMENTS

| | | |
|---|---|---|
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| GB | 1105975 A | 3/1968 |
| GB | 1177134 A | 1/1970 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |
| WO | WO 2015/057215 A1 | 4/2015 |
| WO | WO 2016/089419 A1 | 6/2016 |
| WO | WO 2017/099709 A1 | 6/2017 |
| WO | WO 2018/111229 A1 | 6/2018 |
| WO | WO 2018/218177 A1 | 11/2018 |

OTHER PUBLICATIONS

International Search Report and Written Opinion for PCT/US18/46959 dated Nov. 5, 2018.

[No Author Listed], The HLB system: a time-saving guide to emulsifier selection. ICI Americas Inc. 1976. 22 pages.

Adm, Evolution Chemicals E5789-117 Description. Jun. 2014. 1 page.

Brost et al., Surfactants assist water-in-oil monitoring by fluorescence. World Oil. Oct. 2008;229(10):12 pages.

Champagne et al., Critical assessment of microemulsion technology for enhancing fluid recovery from tight gas formations and propped

(56) References Cited

OTHER PUBLICATIONS fractures. SPE European Formation Damage Conference. Noordwijk, The Netherlands. Jun. 7-10, 2011. SPE-144095. 10 pages.

Crafton et al., Micro-emulsion effectiveness for twenty four wells, Eastern Green River, Wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

U.S. Appl. No. 15/680,460, filed Aug. 18, 2017, Smith et al.

PCT/US18/46959, Nov. 5, 2018, International Search Report and Written Opinion.

* cited by examiner

COMPOSITIONS COMPRISING NON-HALOGENATED SOLVENTS FOR USE IN OIL AND/OR GAS WELLS AND RELATED METHODS

FIELD OF INVENTION

Compositions comprising non-halogenated solvents for use in various aspects of a life cycle of an oil and/or gas well, and related methods, are provided.

BACKGROUND OF INVENTION

Fluid compositions are commonly employed in a variety of operations related to the extraction of hydrocarbons, such as well stimulation. Subterranean formations are often stimulated to improve recovery of hydrocarbons. Common stimulation techniques include hydraulic fracturing. Hydraulic fracturing consists of the high pressure injection of a fluid containing suspended proppant into the wellbore in order to create fractures in the rock formation and facilitate production from low permeability zones. All chemicals pumped downhole in an oil and/or gas well can filter through the reservoir rock and block pore throats with the possibility of creating formation damage. It is well known that fluid invasion can significantly reduce hydrocarbon production from a well. In order to reduce fluid invasion, compositions are generally added to the well-treatment fluids to help unload the residual aqueous treatment from the formation.

Accordingly, although a number of compositions are known in the art, there is a continued need for more effective compositions for use in treatment of an oil and/or gas well.

SUMMARY OF INVENTION

Generally, compositions comprising non-halogenated solvents for use in various aspects of a life cycle of an oil and/or gas well, and related methods, are provided.

In one aspect, this disclosure is generally directed to a composition. In some embodiments, the composition may be used for treating an oil and/or gas well having a wellbore. In some embodiments, the composition comprises from about 90 wt % to about 99.9 wt % of a solvent blend versus the total weight of the composition, wherein the solvent blend comprises: a terpene and a non-halogenated solvent; and from about 0.1 wt % to about 10 wt % of one or more surfactants versus the total weight of the composition.

In another aspect, this disclosure is generally directed to a method. In some embodiments, the method is a method of treating an oil and/or gas well having a wellbore, wherein the wellbore comprises one or more fluids. In some embodiments, the method comprises delivering a composition into the wellbore, wherein the composition comprises from about 90 wt % to about 99.9 wt % of a solvent blend versus the total weight of the composition, wherein the solvent blend comprises: a terpene and a non-halogenated solvent; and from about 0.1 wt % to about 10 wt % of one or more surfactants versus the total weight of the composition; and causing the composition to travel through the one or more fluids to reduce residues on the wellbore or near the wellbore.

Other aspects, embodiments, and features of the methods and compositions will become apparent from the following detailed description. All patent applications and patents incorporated herein by reference are incorporated by reference in their entirety. In case of conflict, the present specification, including definitions, will control.

DETAILED DESCRIPTION

Compositions comprising non-halogenated solvents for use in various aspects of a life cycle of an oil and/or gas well, and related methods, are provided. In some embodiments, the composition comprises a solvent blend and one or more surfactants. In some embodiments, the solvent blend comprises a first type of solvent (e.g., a terpene) and a second type of solvent (e.g., a non-halogenated solvent). The composition may comprise about 90 wt % to 99.9 wt % of the solvent blend, and about 0.1 wt % to 10 wt % of one or more surfactants, versus the total weight of the composition. In some embodiments, compositions can be used in methods for treating an oil and/or gas well, having a wellbore that comprises one or more fluids. A composition may be delivered into the wellbore, traveling through the one or more fluids to reduce or remove residues comprising asphaltenes, paraffins or combinations thereof on or near the wellbore.

In some embodiments, the composition consists essentially of the solvent blend and the one or more surfactants. In some embodiments, the composition consists of the solvent blend (e.g., comprising a first type of solvent, a second type of solvent, and, in some embodiments, a third type of solvent) and the one or more surfactants. In some embodiments, the composition includes X wt % of the solvent blend, and (100-X) wt % of the one or more surfactants. In some embodiments, X wt % is from about 90 wt % to about 99.9 wt %, or from about 93 wt % to about 99.9 wt %, or from about 95 wt % to about 99.9 wt %, or from about 98 wt % to about 99.9 wt % of the total amount of the solvent. In some embodiments, the composition consists or consists essentially of a first type of solvent, a second type of solvent, and one or more surfactants. In some embodiments, the composition consists or consists essentially of a first type of solvent, a second type of solvent, a third type of solvent, and one or more surfactants. In some embodiments, the composition consists or consists essentially of a first type of solvent that is a terpene, a second type of solvent that is a non-halogenated solvent (e.g., a non-halogenated aromatic ester solvent), and one or more surfactants. In some embodiments, the second type of solvent is non-halogenated. In some embodiments, the second type of solvent does not present risks to environmental health and safety and/or is biodegradable. In some embodiments, the second type of solvent is non-toxic, non-carcinogenic, non-mutagenic, and/or non-teratogenic. In some embodiments, a solvent is a liquid that dissolves other substances, for example, residues or other substances found at or in a wellbore (e.g. kerogens, asphaltenes, paraffins, organic scale).

In oil production, the wellbore is typically filled with fluids, either water, brine, oil, or a combination of these fluids. In some cases, production of oil may be reduced due to the deposition of wax, asphaltenes, or organic scale. Sometimes corrosion can also be a problem. To remedy these problems, the bottom of the wellbore may need to be treated with a solvent or with other chemistries. To successfully treat the bottom of the wellbore, the treatment needs to be delivered below the column of liquid within the wellbore. Many solvents have a lower density than water, so they will not flow to the bottom of the wellbore. Instead, successful treatment of the bottom of the wellbore may require the density of the treatment to be higher than that of the fluid within the wellbore. Common solvents with densities greater than that of water include but are not limited to various halogenated solvents such as trichloroethylene, tetrachloroethene, or carbon tetrachloride. However, these solvents are considered to be environmental hazards, health hazards, and potential ground water contaminants.

Alternatively, there are high-density solvents that are not halogenated. These do not present the health and safety issues of halogenated solvents. They can be used in combination with other, lower density solvents to formulate an effective solvent that will travel through the fluids in a wellbore. These high-density solvent blends can also be used to carry additives, such as anti-corrosion additives or additives to remove deposits of paraffin or asphaltenes or inorganic scale.

The composition generally comprises a solvent blend. In some embodiments, the solvent blend comprises at least two types of solvents. For example, the solvent blend may comprise a first type of solvent and a second type of solvent. In some embodiments, the solvent blend comprises a non-aqueous solvent blend. In some embodiments, the composition comprises from about 90 wt % to about 99.9 wt %, or from about 93 wt % to about 99.9 wt %, or from about 95 wt % to about 99.9 wt %, or from about 98 wt % to about 99.9 wt % of the total amount of the solvent blend, versus the total weight of the composition. In some embodiments, the first type of solvent is a terpene and/or the second type of solvent is a non-halogenated solvent (e.g., a non-halogenated aromatic ester solvent).

In some embodiments, a weight ratio of the first type of solvent (e.g., a terpene) and the second type of solvent (e.g., a non-halogenated solvent, e.g., a non-halogenated aromatic ester solvent) in the solvent blend present in the composition is from about 45:55 to 10:90 (e.g., from about 2:3 to about 1:9), or about 3:7, of the first type of solvent to the second type of solvent.

In some embodiments, each solvent type may comprise more than one solvent of that type. For example, the first type of solvent may comprises a single terpene and the second type of solvent may comprise a single non-halogenated solvent (e.g., a single non-halogenated aromatic ester solvent). As another non-limiting example, the first type of solvent may comprise a first terpene and a second, different terpene, and/or the second type of solvent may comprise a first non-halogenated solvent (e.g., a first non-halogenated aromatic ester solvent) and a second, different non-halogenated solvent (e.g., a second non-halogenated aromatic ester solvent).

In some embodiments, the first type of solvent in the solvent blend in the composition is a substance with a significant hydrophobic character with linear, branched, cyclic, bicyclic, saturated or unsaturated structure. Examples of categories of the first type of solvent include but are not limited to terpenes, terpineols, terpene alcohols, aldehydes, ketones, esters, amines, and amides. In some embodiments, the solvent blend may comprise a terpene. In some embodiments, the solvent blend may comprise an aliphatic hydrocarbon liquid. In some embodiments, the solvent blend may comprise a water-immiscible hydrocarbon liquid. In some embodiments, the first type of solvent in a non-aqueous solvent blend in the composition is a substance (e.g., a liquid) with a significant hydrophobic character with linear, branched, cyclic, bicyclic, saturated, or unsaturated structure, including terpenes and/or alkyl aliphatic carboxylic acid esters.

Examples of categories of solvent in the solvent blend include but are not limited to terpenes, terpineols, terpene alcohols, aldehydes, ketones, esters, amines, amides, terpenoids, alkyl aliphatic carboxylic acid esters, aliphatic hydrocarbon liquids, water immiscible hydrocarbon liquids, silicone fluids and combinations thereof. Additional details are provided herein.

In some embodiments, the second type of solvent comprises at least one non-halogenated solvent (e.g., at least one non-halogenated aromatic ester solvent). In some embodiments, the second type of solvent is a non-halogenated aromatic ester solvent. As noted above, the at least one type of non-halogenated solvent may comprise more than one non-halogenated aromatic ester solvent, e.g., a first non-halogenated aromatic ester solvent and a second, different, non-halogenated aromatic ester solvent. For example, in some embodiments, the second type of solvent comprises a first non-halogenated aromatic ester solvent and a second non-halogenated aromatic ester solvent. The term "non-halogenated" is given its ordinary meaning in the art and refers to chemical entity that does not include a halogen atom (e.g., fluorine, chlorine, bromine, iodine). The term non-halogenated solvent is thus a solvent that does not include a halogen atom. As used herein, the term "aromatic ester" is given its ordinary meaning in the art and refers to an ester in which the ester oxygen of the carboxylate group is associated with a group comprising an aromatic group. Generally, the aromatic ester solvent is a liquid at room temperature and pressure. In some embodiments, the aromatic ester comprises the formula:

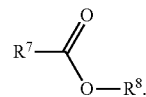

wherein $R^7$ comprises an aromatic group and $R^8$ is a suitable substituent. In some embodiments, $R^7$ comprises an optionally substituted aryl. In some embodiments, $R^7$ is an optionally substituted aryl. In some embodiments, $R^7$ comprises optionally substituted phenyl. In some embodiments, $R^7$ is an optionally substituted phenyl. In some embodiments, $R^7$ is substituted with —OH. In some embodiments, $R^7$ is phenyl. In some embodiments, $R^7$ is Ar—CH=CH—, wherein Ar is an aromatic group. In some embodiments Ar is optionally substituted phenyl. In some embodiments, Ar is phenyl. In some embodiments, $R^8$ is selected from the group consisting of hydrogen, alkyl, optionally substituted alkyl, optionally substituted heteroalkyl, optionally substituted cycloalkyl, optionally substituted aryl, or optionally substituted heterocycle. In some embodiments, the optionally substituted heterocycle may be an optionally substituted cycloheteroalkyl or an optionally substituted heteroaryl. In some embodiments, $R^8$ is an optionally substituted alkyl. In some embodiments, $R^8$ is an alkyl substituted with an aryl group. In some embodiments, $R^8$ is benzyl. In some embodiments, $R^8$ is an unsubstituted alkyl. In some embodiments, $R^8$ is methyl, ethyl, propyl (e.g., n-propyl, i-propyl), or butyl (e.g., n-butyl, i-butyl, t-butyl). In some embodiments, $R^8$ is methyl.

In some embodiments, the non-halogenated aromatic ester solvent is selected from the group consisting of esters of salicylates, benzoates, cinnamates, and phthalates, or combinations thereof. Non-limiting specific examples of non-halogenated aromatic ester solvents include isomers of methyl salicylate, ethyl salicylate, benzyl salicylate, methyl benzoate, ethyl benzoate, benzyl benzoate, methyl cinnamate, ethyl cinnamate. Other non-halogenated aromatic esters include esters of phthalic acid, isophthalic acid, and terephthalic acid where the substituents are linear, branched, aromatic, or cyclic alcohols containing 1-13 carbons. Examples include, but are not limited to, 1,2-dimethylthalate, 1,3-dimethylphthalate, 1,4-dimethylphthalate, 1,2-diethylphthalate, 1,3-diethylphthalate, 1,4-diethylphthalate, di-(2-ethylhexyl) phthalate, butyl benzyl phthalate, 1,2-dibutyl phthalate, 1,2-dicotylphthalate. In certain embodiments the non-halogenated aromatic ester solvent is selected from the group consisting of benzyl benzoate and methyl salicylate, or combinations thereof. In certain embodiments, the non-halogenated aromatic ester solvent is benzyl benzoate. In certain embodiments, the non-halogenated aromatic ester solvent is methyl salicylate.

In some embodiments, the solvent blend may comprise a terpene. In some embodiments, the solvent blend may comprise an aliphatic hydrocarbon liquid. In some embodiments, the solvent blend may comprise a water-immiscible hydrocarbon liquid. In some embodiments, the first type of solvent in a non-aqueous solvent blend in the composition is a substance (e.g., a liquid) with a significant hydrophobic character with linear, branched, cyclic, bicyclic, saturated, or unsaturated structure, including terpenes and/or alkyl aliphatic carboxylic acid esters.

Examples of categories of solvent in the solvent blend include but are not limited to terpenes, terpineols, terpene alcohols, aldehydes, ketones, esters, amines, amides, terpenoids, alkyl aliphatic carboxylic acid esters, aliphatic hydrocarbon liquids, water immiscible hydrocarbon liquids, silicone fluids and combinations thereof.

Terpenes

In some embodiments, the first type of solvent comprises at least one terpene. In some embodiments, the first type of solvent is a terpene. In some embodiments, the first type of solvent comprises a first terpene and a second, different terpene.

Terpenes are generally derived biosynthetically from units of isoprene. Terpenes may be generally classified as monoterpenes (e.g., having two isoprene units), sesquiterpenes (e.g., having 3 isoprene units), diterpenes, or the like. The term "terpenoid" includes natural degradation products, such as ionones, and natural and synthetic derivatives, e.g., terpene alcohols, ethers, aldehydes, ketones, acids, esters, epoxides, and hydrogenation products (e.g., see Ullmann's Encyclopedia of Industrial Chemistry, 2012, pages 29-45, herein incorporated by reference). In some embodiments, the terpene is a naturally occurring terpene. In some embodiments, the terpene is a non-naturally occurring terpene and/or a chemically modified terpene (e.g., saturated terpene, terpene amine, fluorinated terpene, or silylated terpene). When terpenes are modified chemically, such as by oxidation or rearrangement of the carbon skeleton, the resulting compounds may be referred to as terpenoids. Many references use "terpene" and "terpenoid" interchangeably, and this disclosure will adhere to that usage.

In some embodiments, the terpene is a non-oxygenated terpene. In some embodiments, the terpene is citrus terpene. In some embodiments, the terpene is d-limonene. In some embodiments, the terpene is dipentene. In some embodiments, the terpene is selected from the group consisting of d-limonene, nopol, alpha terpineol, eucalyptol, dipentene, linalool, alpha-pinene, beta-pinene, alpha-terpinene, geraniol, alpha-terpinyl acetate, menthol, menthone, cineole, citranellol, and combinations thereof. As used herein, "terpene" refers to a single terpene compound or a blend of terpene compounds.

In some embodiments, the terpene is an oxygenated terpene. Non-limiting examples of oxygenated terpenes include terpenes containing alcohol, aldehyde, ether, or ketone groups. In some embodiments, the terpene comprises an ether-oxygen, for example, eucalyptol, or a carbonyl oxygen, for example, menthone. In some embodiments the terpene is a terpene alcohol. Non-limiting examples of terpene alcohols include linalool, geraniol, nopol, α-terpineol, and menthol. Non-limiting examples of oxygenated terpenes include eucalyptol, 1,8-cineol, menthone, and carvone.

Alkyl Aliphatic Carboxylic Acid Esters

In some embodiments, the solvent blend comprises an alkyl aliphatic carboxylic acid ester. As used herein "alkyl aliphatic carboxylic acid ester" refers to a compound or a blend of compounds having the general formula:

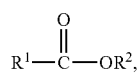

wherein $R^1$ is a $C_6$ to $C_{12}$ optionally substituted aliphatic group, including those bearing heteroatom-containing substituent groups, and $R^2$ is a $C_1$ to $C_6$ alkyl group. In some embodiments, $R^1$ is $C_6$ to $C_{12}$ alkyl. In some embodiments, $R^1$ is substituted with at least one heteroatom-containing substituent group. For example, wherein a blend of compounds is provided and each $R^2$ is —$CH_3$ and each $R^1$ is independently a $C_6$ to $C_{12}$ aliphatic group, the blend of compounds is referred to as methyl aliphatic carboxylic acid esters, or methyl esters. In some embodiments, such alkyl aliphatic carboxylic acid esters may be derived from a fully synthetic process or from natural products, and thus comprise a blend of more than one ester. In some embodiments, the alkyl aliphatic carboxylic acid ester comprises butyl 3-hydroxybutyrate, isopropyl 3-hydroxybutyrate, hexyl 3-hydroxylbutyrate, and combinations thereof.

Non-limiting examples of alkyl aliphatic carboxylic acid esters include methyl octanoate, methyl decanoate, a blend of methyl octanoate and methyl decanoate, and butyl 3-hydroxybutyrate.

Alkanes

In some embodiments, the solvent blend comprises an unsubstituted cyclic or acyclic, branched or unbranched alkane. In some embodiments, the cyclic or acyclic, branched or unbranched alkane has from 6 to 12 carbon atoms. Non-limiting examples of unsubstituted, acyclic, unbranched alkanes include hexane, heptane, octane, nonane, decane, undecane, dodecane, and combinations thereof. Non-limiting examples of unsubstituted, acyclic, branched alkanes include isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2,-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g., 3-ethylhexane), isomers of trimethylpentane (e.g., 2,2,3-trimethylpentane, 2,2,4-trimethylpentane, 2,3,3-trimethylpentane, 2,3,4-trimethylpentane), isomers of ethylmethylpentane (e.g., 3-ethyl-2-methylpentane, 3-ethyl-3-methylpentane), and combinations thereof. Non-limiting examples of unsubstituted cyclic branched or unbranched alkanes include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, cyclononane, methylcyclooctane, dimethylcycloheptane, ethylcycloheptane, trimethylcyclohexane, ethylmethylcyclohexane, propylcyclohexane, cyclodecane, and combinations thereof. In a particular embodiment, the unsubstituted cyclic or acyclic, branched or unbranched alkane, having from 6 to 12 carbon atoms is selected from the group consisting of heptane, octane, nonane, decane, 2,2,4-trimethylpentane (isooctane), and propylcyclohexane, and combinations thereof.

Unsaturated Hydrocarbon Solvents

In some embodiments, the solvent blend comprises an unsubstituted acyclic branched alkene or unsubstituted acyclic unbranched alkene having one or two double bonds and from 6 to 12 carbon atoms. In some embodiments, the solvent blend comprises an unsubstituted acyclic branched alkene or unsubstituted acyclic unbranched alkene having one or two double bonds and from 6 to 10 carbon atoms. Non-limiting examples of unsubstituted acyclic unbranched alkenes having one or two double bonds and from 6 to 12 carbon atoms include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, isomers of dodecadiene, and combinations thereof. In some embodiments, the acyclic, unbranched alkene having one or two double bonds and from 6 to 12 carbon atoms is an alpha-olefin (e.g., 1-hexene, 1-heptene, 1-octene, 1-nonene, 1-decene, 1-undecene, 1-dodecene). Non-limiting examples of unsubstituted, acyclic, branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylhexptene, isomers of methylethylheptene, and combinations thereof. In a particular embodiment, the unsubstituted, acyclic, unbranched alkene having one or two double bonds and from 6 to 12 carbon atoms is 1-octene, 1,7-octadiene, or a combination thereof.

Aromatic Solvents

In some embodiments, the solvent blend comprises an aromatic solvent having a boiling point from about 300 to about 400 degrees Fahrenheit. Non-limiting examples of aromatic solvents having a boiling point from about 300 to about 400 degrees Fahrenheit include butylbenzene, hexylbenzene, mesitylene, light aromatic naphtha, heavy aromatic naphtha, and combinations thereof.

In some embodiments, the solvent blend comprises an aromatic solvent having a boiling point from about 175 to about 300 degrees Fahrenheit. Non-limiting examples of aromatic liquid solvents having a boiling point from about 175 to about 300 degrees Fahrenheit include benzene, xylenes, and toluene. In a particular embodiment, the solvent blend does not comprise toluene or benzene.

Dialkyl Ethers

In some embodiments, the solvent blend comprises a branched or unbranched dialkylether having the formula $C_nH_{2n+1}OC_mH_{2m+1}$ wherein n+m is from 6 to 16. In some embodiments, n+m is from 6 to 12, or from 6 to 10, or from 6 to 8. Non-limiting examples of branched or unbranched dialkylether compounds having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{ii}$, isomers of $C_4H_9OC_6H_{13}$, isomers of $C_5H_{11}O$ $C_6H_{13}$, and isomers of $C_6H_{13}O$ $C_6H_{13}$. In a particular embodiment, the branched or unbranched dialklyether is an isomer of $C_6H_{13}O$ $C_6H_{13}$ (e.g., dihexylether).

Bicyclic Hydrocarbon Solvents

In some embodiments, the solvent blend comprises a bicyclic hydrocarbon solvent with varying degrees of unsaturation including fused, bridgehead, and spirocyclic compounds. Non-limiting examples of bicyclic solvents include isomers of decalin, tetrahydronapthalene, norbornane, norbornene, bicyclo[4.2.0]octane, bicyclo[3.2.1]octane, spiro[5.5]dodecane, and combinations thereof.

In some embodiments, the solvent blend comprises a bicyclic hydrocarbon solvent with varying degrees of unsaturation and containing at least one O, N, or S atom including fused, bridgehead, and spirocyclic compounds. Non-limiting examples include isomers of 7 oxabicyclo [2.2.1]heptane, 4,7-epoxyisobenzofuran-1,3-dione, 7 oxabicyclo[2.2.1]heptane-2,3-dicarboxylic acid, 2,3-dimethyl ester, and combinations thereof.

Alcohols

In some embodiments, the solvent blend comprises a cyclic or acyclic, branched or unbranched alkane having from 6 to 12 carbon atoms and substituted with a hydroxyl group. Non-limiting examples of cyclic or acyclic, branched or unbranched alkanes having from 6 to 12 carbon atoms and substituted with a hydroxyl group include isomers of nonanol, isomers of decanol, isomers of undecanol, isomers of dodecanol, and combinations thereof. In a particular embodiment, the cyclic or acyclic, branched or unbranched alkane having from 9 to 12 carbon atoms and substituted with a hydroxyl group is 1-nonanol, 1-decanol, or a combination thereof.

Non-limiting examples of cyclic or acyclic, branched or unbranched alkanes having 8 carbon atoms and substituted with a hydroxyl group include isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, isomers of trimethylpentanol, and combinations thereof. In a particular embodiment, the cyclic or acyclic, branched or unbranched alkane having 8 carbon atoms and substituted with a hydroxyl group is 1-octanol, 2-ethyl-1-hexanol, or a combination thereof.

Amine Solvents

In some embodiments, the solvent blend comprises an amine of the formula $NR^1R^2R^3$, wherein $R^1$, $R^2$, and $R^3$ are the same or different and are $C_{1-16}$ alkyl groups that are (i) branched or unbranched; (ii) cyclic or acyclic; and (iii) substituted or unsubstituted. In some embodiments any two of $R^1$, $R^2$, and $R^3$ are joined together to form a ring. In some embodiments, each of $R^1$, $R^2$, and $R^3$ are the same or different and are hydrogen or alkyl groups that are (i) branched or unbranched; (ii) cyclic or acyclic; and (iii) substituted or unsubstituted. In some embodiments, any two of $R^1$, $R^2$, and $R^3$ are joined together to form a ring, provided at least one of $R^1$, $R^2$, and $R^3$ is a methyl or an ethyl group.

In some embodiments, $R^1$ is $C_1$-$C_6$ alkyl group that is (i) branched or unbranched; (ii) cyclic or acyclic; and (iii) substituted or unsubstituted and $R^2$ and $R^3$ are hydrogen or a $C_{8-16}$ alkyl group that is (i) branched or unbranched; (ii) cyclic or acyclic; and (iii) substituted or unsubstituted. In some embodiments, $R^2$ and $R^3$ may be joined together to form a ring. In some embodiments, $R^1$ is a methyl or an ethyl group and $R^2$ and $R^3$ are the same or different and are $C_{8-16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ is a methyl group and $R^2$ and $R^3$ are the same or different and are hydrogen or $C_{8-16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ and $R^2$ are the same or different and are hydrogen or $C_1$-$C_6$ alkyl groups that are (i) branched or unbranched; (ii) cyclic or acyclic; and (iii) substituted or unsubstituted and $R^3$ is a $C_{8-16}$ alkyl group that is (i) branched or unbranched; (ii) cyclic or acyclic; and (iii) substituted or unsubstituted. In some embodiments, $R^1$ and $R^2$ are the same or different and are a methyl or an ethyl group and $R^3$ is hydrogen or a $C_{8-16}$ alkyl group that is (i) branched or unbranched; (ii) cyclic or acyclic; and (iii) substituted or unsubstituted. In some embodiments, $R^1$ and $R^2$ are methyl groups and $R^3$ is hydrogen or a $C_{8-16}$ alkyl group that is (i) branched or unbranched; (ii) cyclic or acyclic; and (iii) substituted or unsubstituted.

In some embodiments, the amine is of the formula $NR^1R^2R^3$, wherein $R^1$ is methyl and $R^2$ and $R^3$ are $C_{8-16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-octylamine, isomers of N-methyl-nonylamine, isomers of N-methyl-decylamine, isomers of N-methylundecylamine, isomers of N-methyldodecylamine, isomers of N-methyl teradecylamine, isomers of N-methyl-hexadecylamine, and combinations thereof. In some embodiments, the amine is N-methyl-decylamine, N-methyl-hexadecylamine, or a combination thereof.

In some embodiments, the amine is of the formula $NR^1R^2R^3$, wherein $R^1$ is a methyl group and $R^2$ and $R^3$ are the same or different and are $C_{8-16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-N-octyloctylamine, isomers of N-methyl-N-nonylnonylamine, isomers of N-methyl-N-decyldecylamine, isomers of N-methyl-N-undecylundecylamine, isomers of N-methyl-N-dodecyldodecylamine, isomers of N-methyl-N-tetradecylteradecylamine, isomers of N-methyl-N-hexadecylhexadecylamine, isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the amine is selected from the group consisting of N-methyl-N-octyloctylamine, isomers of N-methyl-N-nonylnonylamine, isomers of N-methyl N-decyldecylamine, isomers of N-methyl-N-undecylundecylamine, isomers of N-methyl-N-dodecyldodecylamine, isomers of N-methyl-N-tetradecylteradecylamine, and isomers of N-methyl-N-hexadecylhexadecylamine, and combinations thereof. In some embodiments, the amine is N-methyl-N-dodecyldodecylamine, one or more isomers of N-methyl-N-hexadecylhexadecylamine, or combinations thereof. In some embodiments, the amine is selected from the group consisting of isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decyldodecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the cyclic or acyclic, branched or unbranched tri-substituted amine is selected from the group consisting of N-methyl-N-octyldodecylamine, N-methyl-N-octylhexadecylamine, and N-methyl-N-dodecylhexadecylamine, and combinations thereof.

In some embodiments, the amine is of the formula $NR^1R^2R^3$, wherein $R^1$ and $R^2$ are methyl and $R^3$ is a $C_{8-16}$ alkyl that is (i) branched or unbranched; (ii) cyclic or acyclic; and (iii) substituted or unsubstituted. Non-limiting examples of amines include isomers of N,N-dimethylnonylamine, isomers of N,N-dimethyldecylamine, isomers of N,N-dimethylundecylamine, isomers of N,N-dimethyldodecylamine, isomers of N,N-dimethyltetradecylamine, and isomers of N,N-dimethylhexadecylamine. In some embodiments, the amine is selected from the group consisting of N,N-dimethyldecylamine, isomers of N,N-dodecylamine, and isomers of N,N-dimethylhexadecylamine.

Amide Solvents

In some embodiments, the solvent blend comprises an amide solvent. In some embodiments, the amide is of the formula $N(C=OR^4)R^5R^6$, wherein $R^4$, $R^5$, and $R^6$ are the same or different and are hydrogen or $C_{4-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, each of $R^4$, $R^5$, and $R^6$ are the same or different and are hydrogen or $C_{4-16}$ alkyl groups wherein the alkyl groups are (i) branched or unbranched; (ii) cyclic or acyclic; and (iii) substituted or unsubstituted, provided at least one of $R^4$, $R^5$, and $R^6$ is a methyl or an ethyl group. In some embodiments $R^5$ and $R^6$ are joined together to form a ring. In some embodiments, $R^4$ is hydrogen, $C_1$-$C_6$ alkyl, wherein the alkyl group is (i) branched or unbranched; (ii) cyclic or acyclic; and (iii) substituted or unsubstituted, and $R^5$ and $R^6$ are the same or different and are hydrogen or $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen, methyl, or ethyl and $R^5$ and $R^6$ are $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen and $R^5$ and $R^6$ are the same or different and are $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ and $R^5$ are the same or different and are hydrogen or $C_1$-$C_6$ alkyl groups wherein the alkyl groups are (i) branched or unbranched; (ii) cyclic or acyclic; and (iii) substituted or unsubstituted and $R^6$ is a $C_{8-16}$ alkyl group that is (i) branched or unbranched; (ii) cyclic or acyclic; and (iii) substituted or unsubstituted. In some embodiments, $R^4$ and $R^5$ are the same or different and are independently hydrogen, methyl, or ethyl and $R^6$ is a $C_{8-16}$ alkyl group that is (i) branched or unbranched; (ii) cyclic or acyclic; and (iii) substituted or unsubstituted. In some embodiments, $R^4$ and $R^5$ are hydrogen and $R^6$ is a $C_{8-16}$ alkyl group that is (i) branched or unbranched; (ii) cyclic or acyclic; and (iii) substituted or unsubstituted. In some embodiments, $R^6$ is hydrogen or $R^6$ is a $C_{1-6}$ alkyl group that is (i) branched or unbranched; (ii) cyclic or acyclic; and (iii) substituted or unsubstituted and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^6$ is hydrogen, methyl, or ethyl and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^6$ is hydrogen and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^5$ and $R^6$ are the same or different and are hydrogen or $C_{1-6}$ alkyl groups wherein the alkyl groups are (i) branched or unbranched; (ii) cyclic or acyclic; and (iii) substituted or unsubstituted, and $R^4$ is a $C_{8-16}$ alkyl group that is (i) branched or unbranched; (ii) cyclic or acyclic; and (iii) substituted or unsubstituted. In some embodiments, $R^5$ and $R^6$ are the same or different and are independently hydrogen, methyl, or ethyl and $R^4$ is a $C_{8-16}$ alkyl group that is (i) branched or unbranched; (ii) cyclic or acyclic; and (iii) substituted or unsubstituted. In some embodiments, $R^5$ and $R^6$ are hydrogen and $R^4$ is a $C_{8-16}$ alkyl group that is (i) branched or unbranched; (ii) cyclic or acyclic; and (iii) substituted or unsubstituted.

In some embodiments, the amide is of the formula $N(C=OR^4)R^5R^6$, wherein each of $R^4$, $R^5$, and $R^6$ are the same or different and are $C_{4-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, the amide is of the formula $N(C=O R^4)R^5R^6$, wherein each of $R^4$, $R^5$, and $R^6$ are the same or different and are $C_{8-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. Non-limiting examples of amides include N,N-dioctyloctamide, N,N-dinonylnonamide, N,N-didecyldecamide, N,N-didodecyldodecamide, N,N-diundecylundecamide, N,N-ditetradecyltetradecamide, N,N-dihexadecylhexadecamide, N,N-didecyloctamide, N,N-didodecyloctamide, N,N-dioctyldodecamide, N,N-didecyldodecamide, N,N-dioctylhexadecamide, N,N-didecylhexadecamide, N,N-didodecylhexadecamide, and combinations thereof. In some embodiments, the amide is N,N-dioctyldodecamide, N,N-didodecyloctamide, or a combination thereof.

In some embodiments, the amide is of the formula $N(C=OR^4)R^5R^6$, wherein $R^6$ is selected from the group consisting of hydrogen, methyl, ethyl, propyl and isopropyl, and $R^4$ and $R^5$ are the same or different and are $C_{4-16}$ alkyl groups wherein the alkyl groups are (i) branched or unbranched; (ii) cyclic or acyclic; and (iii) substituted or unsubstituted. In some embodiments, $R^6$ is selected from the group consisting of hydrogen, methyl, ethyl, propyl and isopropyl, and $R^4$ and $R^5$ are the same or different and are $C_{4-8}$ alkyl groups wherein the alkyl groups are (i) branched or unbranched; (ii) cyclic or acyclic; and (iii) substituted or unsubstituted. In some embodiments, at least one of $R^4$ and $R^5$ is substituted with a hydroxyl group. In some embodiments, at least one of $R^4$ and $R^5$ is $C_{1-16}$ alkyl substituted with a hydroxyl group.

In some embodiments, the amide is of the formula $N(C=OR^4)R^5R^6$, wherein $R^6$ is $C_1$-$C_3$ alkyl and $R^4$ and $R^5$ are the same or different and are $C_{4-16}$ alkyl groups that are (i) branched or unbranched; (ii) cyclic or acyclic; and (iii) substituted or unsubstituted. In some embodiments, $R^6$ is selected from the group consisting of methyl, ethyl, propyl, and isopropyl, and $R^4$ and $R^5$ are the same or different and are $C_{4-16}$ alkyl groups that are (i) branched or unbranched; (ii) cyclic or acyclic; and (iii) substituted or unsubstituted. In some embodiments, $R^6$ is selected from the group consisting of methyl, ethyl, propyl, and isopropyl, and $R^4$ and $R^5$ are the same or different and are $C_{8-16}$ alkyl groups that are (i) branched or unbranched; (ii) cyclic or acyclic; and (iii) substituted or unsubstituted. In some embodiments, at least one of $R^4$ and $R^5$ is substituted with a hydroxyl group. In some embodiments, $R^6$ is selected from the group consisting of methyl, ethyl, propyl, and isopropyl, and $R^4$ and $R^5$ are the same or different and are $C_{4-16}$ alkyl groups that are (i) branched or unbranched; (ii) cyclic or acyclic; and (iii) substituted or unsubstituted. In some embodiments at least one of $R^4$ and $R^5$ is $C_{1-16}$ alkyl substituted with a hydroxyl group.

Non-limiting examples of amides include N,N-di-tert-butylformamide, N,N-dipentylformamide, N,N-dihexylformamide, N,N-diheptylformamide, N,N-dioctylformamide, N,N-dinonylformamide, N,N-didecylformamide, N,N-diundecylformamide, N,N-didodecylformamide, N,N-dihydroxymethylformamide, N,N-di-tert-butylacetamide, N,N-dipentylacetamide, N,N-dihexylacetamide, N,N-diheptylacetamide, N,N-dioctylacetamide, N,N-dinonylacetamide, N,N-didecylacetamide, N,N-diundecylacetamide, N,N-didodecylacetamide, N,N-dihydroxymethylacetamide, N,N-dimethylpropionamide, N,N-diethylpropionamide, N,N-dipropylpropionamide, N,N-di-n-propylpropionamide N,N-diisopropylpropionamide, N,N-dibutylpropionamide, N,N-di-n-butylpropionamide, N,N-di-sec-butylpropionamide, N,N-diisobutylpropionamide or N,N-di-tert-butylpropionamide, N,N-dipentylpropionamide, N,N-dihexylpropionamide, N,N-diheptylpropionamide, N,N-dioctylpropionamide, N,N-dinonylpropionamide, N,N-didecylpropionamide, N,N-diundecylpropionamide, N,N-didodecylpropionamide, N,N-dimethyl-n-butyramide, N,N-diethyl-n-butyramide, N,N-dipropyl-n-butyramide, N,N-di-n-propyl-n-butyramide or N,N-diisopropyl-n-butyramide, N,N-dibutyl-n-butyramide, N,N-di-n-butyl-n-butyramide, N,N-di-sec-butyl-n-butyramide, N,N-diisobutyl-n-butyramide, N,N-di-tert-butyl-n-butyramide, N,N-dipentyl-n-butyramide, N,N-dihexyl-n-butyramide, N,N-diheptyl-n-butyramide, N,N-dioctyl-n-butyramide, N,N-dinonyl-n-butyramide, N,N-didecyl-n-butyramide, N,N-diundecyl-n-butyramide, N,N-didodecyl-n-butyramide, N,N-dipentylisobutyramide, N,N-dihexylisobutyramide, N,N-diheptylisobutyramide, N,N-dioctylisobutyramide, N,N-dinonylisobutyramide, N,N-didecylisobutyramide, N,N-diundecylisobutyramide, N,N-didodecylisobutyramide, N,N-pentylhexylformamide, N,N-pentylhexylacetamide, N,N-pentylhexylpropionamide, N,N-pentylhexyl-n-butyramide, N,N-pentylhexylisobutyramide, N,N-methylethylpropionamide, N,N-methyl-n-propylpropionamide, N,N-methylisopropylpropionamide, N,N-methyl-n-butylpropionamide, N,N-methylethyl-n-butyramide, N,N-methyl-n-butyramide, N,N-methylisopropyl-n-butyramide, N,N-methyl-n-butyl-n-butyramide, N,N-methylethylisobutyramide, N,N-methyl-n-propylisobutyramide, N,N-methylisopropylisobutyramide, and N,N-methyl-n-butylisobutyramide. In some embodiments, the amide is selected from the group consisting of N,N-dioctyldodecacetamide, N,N-methyl-N-octylhexadecdidodecylacetamide, N-methyl-N-hexadecyldodecylhexadecacetamide, and combinations thereof.

In some embodiments, the amide is of the formula N(C=OR$^4$)R$^5$R$^6$, wherein R$^6$ is hydrogen or a methyl group and R$^4$ and R$^5$ are C$_{8-16}$ alkyl groups that are (i) branched or unbranched; (ii) cyclic or acyclic; and (iii) substituted or unsubstituted. Non-limiting amides include isomers of N-methyloctamide, isomers of N-methylnonamide, isomers of N-methyldecamide, isomers of N-methylundecamide, isomers of N methyldodecamide, isomers of N methyl-teradecamide, and isomers of N-methyl-hexadecamide. In some embodiments, the amides are selected from the group consisting of N-methyloctamide, N-methyldodecamide, N-methylhexadecamide, and combinations thereof.

Non-limiting amides include isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, isomers of N methyl-N-tetradecylhexadecamide, and combinations thereof. In some embodiments, the amide is selected from the group consisting of isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, and combinations thereof. In some embodiments, amide is selected from the group consisting of N-methyl-N-octyloctamide, N methyl-N-dodecyldodecamide, and N-methyl-N-hexadecylhexadecamide. In some embodiments, the amide is selected from the group consisting of isomers of N-methyl-N-octylnonamide, isomers of N-methyl-N-octyldecamide, isomers of N-methyl-N-octylundecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, and isomers of N methyl-N-tetradecylhexadecamide. In some embodiments, the amide is selected from the group consisting of N-methyl-N-octyldodecamide, N-methyl-N-octylhexadecamide, and N-methyl-N-dodecylhexadecamide.

In some embodiments, the amide is of the formula N(C=OR$^4$)R$^5$R$^6$, wherein R$^5$ and R$^6$ are the same or different and are hydrogen or C$_1$-C$_3$ alkyl groups and R$^4$ is a C$_{4-16}$ alkyl group that is (i) branched or unbranched; (ii) cyclic or acyclic; and (iii) substituted or unsubstituted. In some embodiments, R$^5$ and R$^6$ are the same or different and are selected from the group consisting of hydrogen, methyl, ethyl, propyl and isopropyl, and R$^4$ is a C$_{4-16}$ alkyl group that is (i) branched or unbranched; (ii) cyclic or acyclic; and (iii) substituted or unsubstituted. In some embodiments, R$^5$ and R$^6$ are the same or different and are selected from the group consisting of hydrogen, methyl, ethyl, propyl and isopropyl and R$^4$ is a C$_{8-16}$ alkyl group that is (i) branched or unbranched; (ii) cyclic or acyclic; and (iii) substituted or unsubstituted. In some embodiments, R$^4$ is substituted with a hydroxyl group. In some embodiments, R$^5$ and R$^6$ are the same or different and are selected from the group consisting of hydrogen, methyl, ethyl, propyl, and isopropyl, and R$^4$ is selected from the group consisting of tert-butyl and C$_{5-16}$ alkyl groups that are (i) branched or unbranched; (ii) cyclic or acyclic; and (iii) substituted or unsubstituted, and C$_{1-16}$ alkyl groups that are (i) branched or unbranched; (ii) cyclic or acyclic; and (iii) substituted with a hydroxyl group.

In some embodiments, the amide is of the formula N(C=OR$^4$)R$^5$R$^6$, wherein R$^5$ and R$^6$ are methyl groups and R$^4$ is a C$_{8-16}$ alkyl group that is (i) branched or unbranched; (ii) cyclic or acyclic; and (iii) substituted or unsubstituted. Non-limiting examples of amides include isomers of N,N-dimethyloctamide, isomers of N,N-dimethylnonamide, isomers of N,N-dimethyldecamide, isomers of N,N-dimethylundecamide, isomers of N,N-dimethyldodecamide, isomers of N,N-dimethyltetradecamide, isomers of N,N-dimethylhexadecamide, and combinations thereof. In some embodiments, the cyclic or acyclic, branched or unbranched tri-substituted amines is selected from the group consisting of N,N-dimethyloctamide, N,N-dodecamide, and N,N-dimethylhexadecamide.

Silicone Solvents

In some embodiments, the solvent blend in the composition comprises a methyl siloxane solvent. The composition may comprise a single methyl siloxane solvent or a combination of two or more methyl siloxane solvents. Methyl siloxane solvents may be classified as linear, cyclic, or branched. Methyl siloxane solvents are a class of oligomeric liquid silicones that possess the characteristics of low viscosity and high volatility. Non-limiting examples of linear siloxane solvents include hexamethyldisiloxane, octamethyltrisiloxane, decamethyltetrasiloxane, and dodecamethylpentasiloxane. Non-limiting examples of cyclic siloxane solvents include octamethylcyclotetrasiloxane, decamethylcyclopentasiloxane, and dodecamethylcyclohexasiloxane.

In some embodiments the siloxane solvent comprises a first type of siloxane solvent and a second type of siloxane solvent.

In some embodiments, the siloxanes are linear methyl siloxanes, cyclic methyl siloxanes, branched methyl siloxanes, and combinations thereof. The linear methyl siloxanes have the formula (CH$_3$)$_3$SiO{(CH$_3$)$_2$SiO}$_k$Si(CH$_3$)$_3$ wherein the value of k is 0-5. The cyclic methyl siloxanes have the formula {(CH$_3$)$_2$SiO}$_t$ wherein the value of t is 3-6. Preferably, these methyl siloxanes have a boiling point less than about 250° C. and viscosity of about 0.65 to about 5.0 cSt.

Some representative linear methyl siloxanes are hexamethyldisiloxane with a boiling point of 100 degrees Celsius, viscosity of 0.65 cSt, and structure

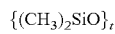

octamethyltrisiloxane with a boiling point of 152 degrees Celsius, viscosity of 1.04 cSt, and structure

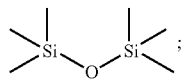

decamethyltetrasiloxane with a boiling point of 194 degrees Celsius, viscosity of 1.53 cSt, and structure

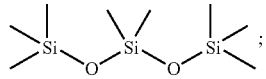

dodecamethylpentasiloxane with a boiling point of 229 degrees Celsius, viscosity of 2.06 cSt, and structure

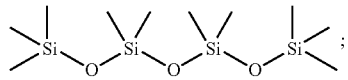

tetradecamethylhexasiloxane with a boiling point of 245 degrees Celsius, viscosity of 2.63 cSt, and structure

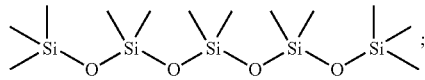

and hexadecamethylheptasiloxane with a boiling point of 270 degrees Celsius, viscosity of 3.24 cSt, and structure

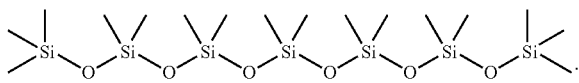

Some representative cyclic methyl siloxanes are hexamethylcyclotrisiloxane with a boiling point of 134 degrees Celsius and structure

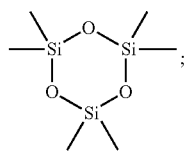

octamethylcyclotetrasiloxane with a boiling point of 176 degrees Celsius, viscosity of 2.3 cSt, and structure

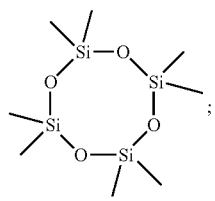

decamethylcyclopentasiloxane with a boiling point of 210 degrees Celsius, viscosity of 3.87 cSt, and structure

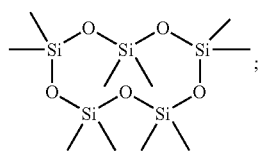

and dodecamethylcyclohexasiloxane with a boiling point of 245 degrees Celsius, viscosity of 6.62 cSt, and structure

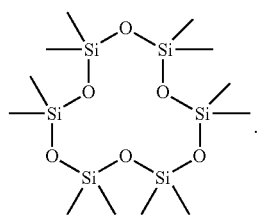

In some embodiments, a solvent (e.g., a terpene) may be extracted from a natural source (e.g., citrus, pine), and may comprise one or more impurities present from the extraction process. In some embodiments, the solvent comprises a crude cut (e.g., uncut crude oil, e.g., made by settling, separation, heating, etc.). In some embodiments, the solvent is a crude oil (e.g., naturally occurring crude oil, uncut crude oil, crude oil extracted from the wellbore, synthetic crude oil, crude citrus oil, crude pine oil, *eucalyptus*, etc.). In some embodiments, the solvent comprises a citrus extract (e.g., crude orange oil, orange oil, etc.). In some embodiments, the solvent is a citrus extract (e.g., crude orange oil, orange oil, etc.).

In some embodiments, the solvent blend may further comprise a third type of solvent. Non-limiting examples of the third type of solvent include plant-based methyl esters (e.g. soy methyl ester, canola methyl ester), alcohols, amides, and hydrocarbons, or combinations thereof. In some embodiments, the third type of solvent is an alkyl aliphatic ester solvent. In some embodiments, the alkyl aliphatic ester solvent is a methyl ester. In some embodiments, the third type of solvent is selected from the group consisting of soy methyl ester, canola methyl ester, octanoic acid methyl ester, decanoic acid methyl ester, dodecanoic acid methyl ester, palm methyl ester, and coconut methyl ester, or combinations thereof. In some embodiments, the third type of solvent is butyl 3-hydroxybutanoate. Without wishing to be bound by theory, the third type of solvent (e.g., alkyl aliphatic ester solvent) may serve as a coupling agent between the other components of the solvent blend and the one or more surfactant. In some embodiments, the third type of solvent may be an alcohol. In some embodiments, the alcohol is selected from the group consisting of primary, secondary, and tertiary alcohols having from 1 to 20 carbon atoms. Non-limiting examples of alcohols include methanol, ethanol, isopropanol, n-propanol, n-butanol, i-butanol, sec-butanol, iso-butanol, t-butanol, ethylene glycol, propylene glycol, dipropylene glycol monomethyl ether, triethylene glycol, and ethylene glycol monobutyl ether.

Generally, the composition comprises a surfactant. In some embodiments, the composition comprises a first surfactant and a second surfactant. In some embodiments the composition comprises a first surfactant and a co-surfactant. In some embodiments the composition comprises a first surfactant, a second surfactant and a co-surfactant. The term surfactant is given its ordinary meaning in the art and generally refers to compounds having an amphiphilic structure which gives them a specific affinity for oil/water-type and water/oil-type interfaces.

The term surfactant includes but is not limited to nonionic surfactants, anionic surfactants, cationic surfactants, amphoteric surfactants, zwitterionic surfactants, switchable surfactants, cleavable surfactants, dimeric or gemini surfactants, extended surfactants containing a nonionic spacer arm central extension and an ionic or nonionic polar group, and mixtures thereof. Nonionic surfactants generally do not contain any charges. Anionic surfactants generally possess a net negative charge. Cationic surfactants generally possess a net positive charge. Amphoteric surfactants generally have both positive and negative charges, however, the net charge of the surfactant can be positive, negative, or neutral, depending on the pH of the solution. Zwitterionic surfactants are generally not pH dependent. A zwitterion is a neutral molecule with a positive and a negative electrical charge, though multiple positive and negative charges can be present.

"Extended surfactants" are defined herein to be surfactants having propoxylated/ethoxylated spacer arms. The extended chain surfactants are intramolecular mixtures having at least one hydrophilic portion and at least one lipophilic portion with an intermediate polarity portion in between the hydrophilic portion and the lipophilic portion; the intermediate polarity portion may be referred to as a spacer. They attain high solubilization in the composition, and in some instances, insensitive to temperature and are useful for a wide variety of oil types, such as natural or synthetic polar oil types in a non-limiting embodiment. More information related to extended chain surfactants may be found in U.S. Pat. No. 8,235,120, incorporated herein by reference.

The term co-surfactant as used herein is given its ordinary meaning in the art and refers to compounds (e.g., pentanol) that act in conjunction with surfactants at an interface.

In some embodiments, the one or more surfactants is a surfactant described in U.S. patent application Ser. No. 14/212,731, filed Mar. 14, 2014, entitled "METHODS AND COMPOSITIONS FOR USE IN OIL AND/OR GAS WELLS," now published as US/2014/0284053 on Sep. 25, 2014, herein incorporated by reference. In some embodiments, the surfactant is a surfactant described in U.S. patent application Ser. No. 14/212,763, filed Mar. 14, 2014, entitled "METHODS AND COMPOSITIONS FOR USE IN OIL AND/OR GAS WELLS," now published as US/2014/0338911 on Nov. 20, 2014, herein incorporated by reference.

In some embodiments, the composition comprises from about 0.1 wt % to about 10 wt %, or from about 0.1 wt % to about 8 wt %, or from about 0.1 wt % to about 6 wt %, or from about 0.1 wt % to about 4 wt %, or from about 0.1 wt % to about 3 wt %, or from about 0.1 wt % to about 2 wt % of the one or more surfactants, versus the total weight of the composition. In some embodiments, the one or more surfactants are present in a low percentage by weight of the composition such that upon introducing an aqueous phase to the composition, the aqueous and non-aqueous phases spontaneously separate. That is, in some embodiments, upon addition of the composition to water or another aqueous phase, a stable emulsion or microemulsion does not form.

In some embodiments, the composition comprises from about 1 wt % to about 50 wt %, or from about 1 wt % to about 40 wt %, or from about 1 wt % to about 35 wt %, or from about 5 wt % to about 40 wt %, or from about 5 wt % to about 35 wt %, or from about 10 wt % to about 30 wt % of the surfactant versus the total weight of the composition.

In some embodiments, the surfactants generally have hydrophile-lipophile balance (HLB) values from 8 to 18 or from 8 to 14.

In some embodiments, the surfactant is a surfactant that allows the composition to pass through a layer of water or brine under circumstances where the only external force is gravity. The term "pass through" is given its ordinary meaning in the art and may refer to sinking below the surface of, penetrating the surface of, and/or dropping below the surface of a layer of material.

Hydrocarbon Surfactants

Suitable surfactants for use with the compositions and methods are generally described herein. In some embodiments, the surfactant comprises a hydrophilic hydrocarbon surfactant.

Nonionic Surfactants

In some embodiments, the surfactant comprises a nonionic surfactant. In some embodiments, the surfactant is an alkoxylated aliphatic alcohol having from 3 to 40 ethylene oxide (EO) units and from 0 to 20 propylene oxide (PO) units. The term aliphatic alcohol generally refers to a branched or linear, saturated or unsaturated aliphatic moiety having from 6 to 18 carbon atoms.

In some embodiments, the hydrophilic hydrocarbon surfactant comprises an alcohol ethoxylate, wherein the alcohol ethoxylate contains a hydrocarbon group of 10 to 18 carbon atoms and contains an ethoxylate group of 5 to 12 ethylene oxide units.

In some embodiments, the surfactant is selected from the group consisting of ethoxylated fatty acids, ethoxylated fatty amines, and ethoxylated fatty amides wherein the fatty portion is a branched or linear, saturated or unsaturated aliphatic hydrocarbon moiety having from 6 to 18 carbon atoms.

In some embodiments, the surfactant is an alkoxylated castor oil. In some embodiments, the surfactant is a sorbitan ester derivative. In some embodiments the surfactant is an ethylene oxide-propylene oxide copolymer wherein the total number of EO and PO units is from 8 to 40 units. In some embodiments, the surfactant is an alkoxylated tristyryl phenol containing from 6 to 100 total ethylene oxide (EO) and propylene oxide (PO) units.

In some embodiments, the surfactant is an amine-based surfactant selected from the group consisting of ethoxylated alkylene amines, ethoxylated alkyl amines, propoxylated alkylene amines, propoxylated alkyl amines, ethoxylated-propoxylated alkylene amines and ethoxylated propoxylated alkyl amines. The ethoxylated/propoxylated alkylene or alkyl amine surfactant component preferably includes more than one nitrogen atom per molecule. Suitable amines include ethylenediaminealkoxylate and diethylenetriaminealkoxylate.

In some embodiments the surfactant is an alkoxylated polyimine with a relative solubility number (RSN) in the range of 5-20. As will be known to those of ordinary skill in the art, RSN values are generally determined by titrating water into a solution of surfactant in 1,4 dioxane. The RSN values is generally defined as the amount of distilled water necessary to be added to produce persistent turbidity. In some embodiments the surfactant is an alkoxylated novolac resin (also known as a phenolic resin) with a relative solubility number in the range of 5-20. In some embodiments the surfactant is a block copolymer surfactant with a total molecular weight greater than 5000 daltons. The block copolymer may have a hydrophobic block that is comprised of a polymer chain that is linear, branched, hyperbranched, dendritic or cyclic.

Glycosides and Glycamides

In some embodiments, the surfactant is an aliphatic polyglycoside having the following formula:

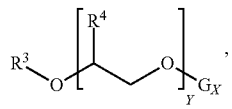

wherein $R^3$ is an aliphatic group having from 6 to 18 carbon atoms; each $R^4$ is independently selected from H, —$CH_3$, or —$CH_2CH_3$; Y is an average number of from about 0 to about 5; and X is an average degree of polymerization (DP) of from about 1 to about 4; G is the residue of a reducing saccharide, for example, a glucose residue. In some embodiments, Y is zero.

In some embodiments, the surfactant is an aliphatic glycamide having the following formula:

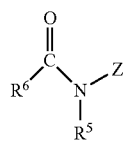

wherein $R^6$ is an aliphatic group having from 6 to 18 carbon atoms; $R^5$ is an alkyl group having from 1 to 6 carbon atoms; and Z is —$CH_2(CH_2OH)_bCH_2OH$, wherein b is from 3 to 5. In some embodiments, $R^5$ is —$CH_3$. In some embodiments, $R^6$ is an alkyl group having from 6 to 18 carbon atoms. In some embodiments, b is 3. In some embodiments, b is 4. In some embodiments, b is 5.

Anionic Surfactants

Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, fatty carboxylates, alkyl sarcosinates, alkyl phosphates and mixtures thereof.

In some embodiments, the surfactant is an aliphatic sulfate wherein the aliphatic moiety is a branched or linear, saturated or unsaturated aliphatic hydrocarbon moiety having from 6 to 18 carbon atoms. In some embodiments, the surfactant is an aliphatic sulfonate wherein the aliphatic moiety is a branched or linear, saturated or unsaturated aliphatic hydrocarbon moiety having from 6 to 18 carbon atoms.

In some embodiments, the surfactant is an aliphatic alkoxy sulfate wherein the aliphatic moiety is a branched or linear, saturated or unsaturated aliphatic hydrocarbon moiety having from 6 to 18 carbon atoms and from 4 to 40 total ethylene oxide (EO) and propylene oxide (PO) units.

In some embodiments, the surfactant is an aliphatic-aromatic sulfate wherein the aliphatic moiety is a branched or linear, saturated or unsaturated aliphatic hydrocarbon moiety having from 6 to 18 carbon atoms. In some embodiments, the surfactant is an aliphatic-aromatic sulfonate wherein the aliphatic moiety is a branched or linear, saturated or unsaturated aliphatic hydrocarbon moiety having from 6 to 18 carbon atoms.

In some embodiments, the surfactant is an ester or half ester of sulfosuccinic acid with monohydric alcohols.

Cationic Surfactants

In some embodiments, the surfactant is a quaternary alkylammonium salt or a quaternary alkylbenzylammonium salt, whose alkyl groups have 1 to 24 carbon atoms (e.g., a halide, sulfate, phosphate, acetate, or hydroxide salt). In some embodiments, the surfactant is a quaternary alkylbenzylammonium salt, whose alkyl groups have 1-24 carbon atoms (e.g., a halide, sulfate, phosphate, acetate, or hydroxide salt). In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt).

In some embodiments, the surfactant is a cationic surfactant such as, monoalkyl quaternary amines, such as cocotrimethylammonium chloride, cetyltrimethylammonium chloride, stearyltrimethylannnonium chloride, soyatrimethylannnonium chloride, behentrimethylammonium chloride, and the like and mixtures thereof. Other suitable cationic surfactants that may be useful include, but are not necessarily limited to, dialkylquaternary amines such as dicetyldimethylammonium chloride, dicocodimethylannnonium chloride, distearyldimethylammonium chloride, and the like and mixtures thereof.

Zwitterionic and Amphoteric Surfactants

In some embodiments, the surfactant is an amine oxide (e.g., dodecyldimethylamine oxide). In some embodiments, the surfactant is amphoteric or zwitterionic, including sultaines (e.g., cocamidopropyl hydroxysultaine), betaines (e.g., cocamidopropyl betaine), or phosphates (e.g., lecithin).

Organosilicone Surfactants

In some embodiments the surfactant comprises a mixture of a hydrophilic hydrocarbon surfactant and a hydrophilic organosilicone surfactant. Although the hydrophilic-lipophilic balance (HLB) system cannot strictly be applied to organosilicone surfactants, approximate HLB values for a hydrophilic organosilicone surfactant are from 8 to 18. In some embodiments, the hydrophilic organosilicone surfactant comprises one or more polyalkylene oxide groups containing from 4 to 40 total ethylene oxide (EO) and propylene oxide (PO) units. In some embodiments, the hydrophilic organosilicone surfactant comprises one or more polyethylene oxide groups containing from 4 to 12 ethylene oxide (EO) groups.

In some embodiments, the composition may comprise a single hydrophilic organosilicone surfactant or a combination of two or more hydrophilic organosilicone surfactants. For example, in some embodiments the hydrophilic organosilicone surfactant comprises a first type of hydrophilic organosilicone surfactant and a second type of hydrophilic organosilicone surfactant.

Non-limiting examples of hydrophilic organosilicone surfactants include polyalkyleneoxide-modified pentamethyldisiloxane, polyalkyleneoxide-modified heptamethyltrisiloxane, polyalkyleneoxide-modified nonamethyltetrasiloxane, polyalkyleneoxide-modified undecamethylpentasiloxane, polyalkyleneoxide-modified tridecamethylhexasiloxane and combinations thereof. The polyalkyleneoxide moiety may be end capped with —H, —CH$_3$, an acetoxy group, or an ethoxy group. The polyalkylene oxide group comprises polyethylene oxide, polypropyleneoxide, polybutyleneoxide, and combinations thereof.

In some embodiments the surfactant is an ethoxylated nonionic organosilicone surfactant. For example, the ethoxylated nonionic organosilicone surfactant may be a trisiloxane with an ethoxylate group having 4 to 12 ethylene oxide (EO) units. Non-limiting examples of such surfactants include trisiloxane surfactants having from 7 to 8 EO units, Momentive Silwet L-77®, Dow Corning Q2-5211 superwetting agent, and Dow Corning Q2-5212 wetting agent.

In some embodiments, the composition comprises a hydrophilic organosilicone surfactant. The composition may comprise a single hydrophilic organosilicone surfactant or a combination of two or more hydrophilic organosilicone surfactants. For example, in some embodiments the hydrophilic organosilicone surfactant comprises a first type of hydrophilic organosilicone surfactant and a second type of hydrophilic organosilicone surfactant. Non-limiting examples of hydrophilic organosilicone surfactants include but are not limited to polyalkyleneoxide-modified pentamethyldisiloxane, polyalkyleneoxide-modified heptamethyltrisiloxane, polyalkyleneoxide-modified nonamethyltetrasiloxane, polyalkyleneoxide-modified undecamethylpentasiloxane, polyalkyleneoxide-modified tridecamethylhexasiloxane, polyalkyleneoxide-modified polydimethylsiloxane and combinations thereof.

In some embodiments, the hydrophilic organosilicone surfactant comprises methoxy-modified polyalkylene pentamethyldisiloxane, methoxy-modified polyalkylene heptamethyltrisiloxane, methoxy-modified polyalkylene nonamethyltetrasiloxane, methoxy-modified polyalkylene undecamethylpentasiloxane, polyalkylene methoxy-modified tridecamethylhexasiloxane, methoxy-modified polyalkyleneoxide-modified polydimethylsiloxane, ethoxy-modified polyalkylene pentamethyldisiloxane, ethoxy-modified polyalkylene heptamethyltrisiloxane, ethoxy-modified polyalkylene nonamethyltetrasiloxane, ethoxy-modified polyalkylene undecamethylpentasiloxane, ethoxy-modified polyalkylene tridecamethylhexasiloxane, ethoxy-modified polyalkyleneoxide-modified polydimethylsiloxane and combinations thereof.

The polyalkyleneoxide moiety may be end capped with —H, —CH$_3$, an acetoxy group, or an ethoxy group. The polyalkylene oxide group comprises polyethylene oxide, polypropyleneoxide, polybutyleneoxide, and combinations thereof.

In some embodiments, the hydrophilic organosilicone surfactant comprises an ethoxylated nonionic organosilicone surfactant. In some embodiments, the ethoxylated nonionic organosilicone surfactant is a trisiloxane with an ethoxylate group having from 4 to 12 ethylene oxide units.

In some embodiments the surfactant is an ethoxylated nonionic organosilicone surfactant. For example, the ethoxylated nonionic organosilicone surfactant may be a trisiloxane with an ethoxylate group having 4 to 12 ethylene oxide (EO) units. Non-limiting examples of such surfactants include trisiloxane surfactants having from 7 to 8 EO units, Momentive Silwet L-77®, Dow Corning Q2-5211 superwetting agent, and Dow Corning Q2-5212 wetting agent.

Non-limiting examples of suitable surfactants include nonionic surfactants with linear or branched structure, including, but not limited to, alkoxylated alcohols, alkoxylated fatty alcohols, alkoxylated castor oils, alkoxylated fatty acids, and alkoxylated fatty amides with a hydrocarbon chain of at least 8 carbon atoms and 5 units or more of alkoxylation. The term alkoxylation includes ethoxylation and propoxylation. Other nonionic surfactants include alkyl glycosides and alkyl glucamides. Additional surfactants are described herein. Other non-limiting examples of surfactants include adsorption modifiers, foamers, surface tension lowering enhancers, and emulsion breaking additives. Specific examples of such surfactants include cationic surfactants with a medium chain length, linear or branched anionic surfactants, alkyl benzene anionic surfactants, amine oxides, amphoteric surfactants, silicone based surfactants, alkoxylated novolac resins (e.g. alkoxylated phenolic resins), alkoxylated polyimines, alkoxylated polyamines, and fluorosurfactants. In some embodiments, the surfactant is a nonionic surfactant. In certain embodiments, the nonionic surfactant may be one or more of an ethoxylated castor oil, an ethoxylated alcohol, an ethoxylated tristyrylphenol, or an ethoxylated sorbitan ester, or combinations thereof. In some embodiments, the surfactant is a surfactant that allows the composition to pass through a layer of water or brine under circumstances where the only external force is gravity. The term "pass through" is given its ordinary meaning in the art and may refer to sinking below the surface of, penetrating the surface of, and/or dropping below the surface of a layer of material.

In some embodiments, the composition is free of any additives. In some embodiments, the composition may be free of any solid additives. In some embodiments, the composition may be free of any emulsified additives.

The compositions described herein may be formed using methods known to those of ordinary skill in the art. In some embodiments, the first type of solvent and the second type of solvent may be combined (e.g., a terpene and a non-halogenated aromatic ester solvent), followed by addition of one or more surfactants and optionally a third type of solvent(s) (e.g., alkyl aliphatic ester solvent(s)) and agitation). The strength, type, and length of the agitation may be varied as known in the art depending on various factors including the components of the composition, the quantity of the composition, and the resulting type of composition formed. For example, for small samples, a few seconds of gentle mixing can yield a well-mixed composition, whereas for larger samples, longer agitation times and/or stronger agitation may be required. Agitation may be provided by any suitable source, e.g., a vortex mixer, a stirrer (e.g., magnetic stirrer), etc.

In some embodiments, the composition may be readily biodegradable, may be relatively benign, may be non-toxic, and/or may have a good environmental health and safety profile. In some embodiments, the composition may have a higher flash point and a lower content of volatile organic compounds as compared to neat terpenes. In some embodiments, the second type of solvent (e.g., a non-halogenated aromatic ester solvent) may have a higher flash point than the first type of solvent (e.g., a terpene).

In some embodiments, the density of the composition may be at least 0.96 g/mL, at least 0.98 g/mL, at least 1.00 g/mL, at least 1.01 g/mL, at least 1.03 g/mL, at least 1.05 g/mL, at least 1.07 g/mL, at least 1.10 g/mL, at least 1.12 g/mL, at least 1.14 g/mL, at least 1.16 g/mL, or at least 1.18 g/mL. In some embodiments, the density of the composition may be at most 1.20 g/mL, at most 1.18 g/mL, at most 1.16 g/mL, at most 1.14 g/mL, at most 1.12 g/mL, at most 1.10 g/mL, at most 1.07 g/mL, at most 1.05 g/mL, at most 1.03 g/mL, at most 1.01 g/mL, at most 1.00 g/mL, or at most 0.98 g/mL. Combinations of these densities are also possible; e.g., the composition may have a density from 0.96 g/mL to 1.20 g/mL, or from 0.98 g/mL to 1.16 g/mL. In some embodiments, the density is at least 1.05 g/mL and at most 1.16 g/mL.

Any suitable method for injecting the composition (e.g., a diluted composition) into a wellbore may be employed. For example, in some embodiments, the composition, optionally diluted, may be injected into a subterranean formation by injecting it into a well or wellbore in the zone of interest of the formation and thereafter pressurizing it into the formation for the selected distance. Methods for achieving the placement of a selected quantity of a mixture in a subterranean formation are known in the art. The well may be treated with the composition for a suitable period of time. The composition and/or other fluids may be removed from the well using known techniques, including producing the well.

It should be understood, that in embodiments where a composition is said to be injected into a wellbore, that the composition may be diluted and/or combined with other liquid component(s) prior to and/or during injection (e.g., via straight tubing, via coiled tubing, etc.). For example, in some embodiments, the composition is diluted with an aqueous carrier fluid (e.g., water, brine, sea water, fresh water, or a well-treatment fluid (e.g., an acid, a fracturing fluid comprising polymers, produced water, sand, slickwater, etc.,)) prior to and/or during injection into the wellbore. In some embodiments, a composition for injecting into a wellbore is provided comprising a composition as described herein and an aqueous carrier fluid, wherein the composition is present in an amount from about 0.1 gallons per thousand gallons (gpt) per dilution fluid to about 50 gpt, or from about 0.1 gpt to about 100 gpt, or from about 0.5 gpt to about 10 gpt, or from about 0.5 gpt to about 2 gpt.

The composition described herein may be used in various aspects (e.g. steps) of the life cycle of an oil and/or gas well, including, but not limited to, drilling, mud displacement, casing, cementing, perforating, stimulation, kill fluids, enhanced oil recovery, improved oil recovery, stored fluid, and offshore applications. Inclusion of a composition into the fluids typically employed in these processes, e.g., drilling fluids, mud displacement fluids, casing fluids, cementing fluids, perforating fluid, stimulation fluids, kill fluids, etc., may result in many advantages as compared to use of the fluid alone.

Various aspects of the well life cycle are described in detail in U.S. patent application Ser. No. 14/212,731, filed Mar. 14, 2014, entitled "METHODS AND COMPOSITIONS FOR USE IN OIL AND/OR GAS WELLS," now published as US/2014/0284053 on Sep. 25, 2014 and in U.S. patent application Ser. No. 14/212,763, filed Mar. 14, 2014, entitled "METHODS AND COMPOSITIONS FOR USE IN OIL AND/OR GAS WELLS," now published as US/2014/0338911 on Nov. 20, 2014, each herein incorporated by reference.

As will be understood by those of ordinary skill in the art, the steps of the life cycle of an oil and/or gas well may be carried out in a variety of orders. In addition, in some embodiments, each step may occur more than once in the life cycle of the well. In some embodiments, the compositions described herein are used in methods to treat an oil and/or gas well having a wellbore, wherein the methods may comprise reducing residues (e.g., wash-off of residues) on or near a wellbore. In some embodiments, the residues comprise kerogens, asphaltenes, paraffins, organic scale, or combinations thereof on or near the wellbore.

In some embodiments, the wellbore comprises one or more fluids. In some embodiments, the wellbore comprises an aqueous layer, e.g. comprising water or brine. In some embodiments, the method of using the composition comprises delivering (e.g., injecting) the composition into the wellbore, and causing the composition to travel through the one or more fluids in order to reduce residues on the wellbore or near the wellbore. In some embodiments, upon injection of the composition into a wellbore, an emulsion or microemulsion is not formed. In some embodiments, the density of the composition is greater than the density of the fluid present in the wellbore, e.g., by 0.05 g/mL. In some embodiments, the composition may be diluted prior to use (e.g., diluted using 2% KCl by weight of water). In some embodiments, the dilution of the composition is to 2 gallons per thousand gallons.

In some embodiments, the composition is able to pass through an aqueous layer of a wellbore, where the only external force is gravity. In some embodiments, a method of determining whether or not the composition would pass through an aqueous layer may comprise gently dropping the liquid composition at the top of the aqueous layer using a plastic pipette and visually observing whether the drop sinks or floats (see e.g., Example 1 and Example 2). In some embodiments, the wellbore is a vertical wellbore; in such embodiments, the density of the composition is greater than about 1 g/mL. In some embodiments, the wellbore is a horizontal wellbore; in such embodiments, the density of the composition is about equal to about 1 g/mL.

In some embodiments, the density of the composition may be adjusted in order to increase or decrease the time required for the composition to separate from the aqueous layer. In some embodiments, as the density of the composition is changed such that the density differential between the composition and the aqueous layer is decreased, the time required for the composition to separate from the aqueous layer is increased. In some embodiments, the reduction of residues on a wellbore or near a wellbore comprising an aqueous layer may be improved by decreasing the density differential between the composition and the aqueous layer, thereby increasing the time required for the composition to separate from the aqueous layer (e.g., decreasing the rate of separation of the composition from the aqueous layer).

In some embodiments, the rate of separation of a composition from an aqueous fluid environment (e.g., water, brine) may be determined by: combining the composition with the aqueous fluid in a container (e.g., a tube) of a size suitable to the quantity of the composition and the aqueous fluid (e.g., a 15 mm diameter by 125 mm height tube); shaking the combination for a period of time so as to achieve a (transient) relatively homogeneous mixture (e.g., for 30 seconds); allowing the shaken mixture to separate; and recording the time at which a separation process is no longer visually detectable (e.g., 5 minutes and 33 seconds). See e.g., Example 3. In some embodiments, two layers result from the separation process: a first layer (e.g., the composition) and a second layer (e.g., the aqueous fluid). In some embodiments, the first layer may comprise small (e.g., micron-sized) droplets dispersed within the first layer. In some embodiments, the small droplets are dispersed uniformly throughout the first layer. In some embodiments, the first layer may not comprise droplets dispersed within the first layer. In some embodiments, the first layer may be optically transparent (e.g., clear). In some embodiments, the second layer may comprise small (e.g., micron-sized) droplets dispersed within the second layer. In some embodiments, the small droplets are dispersed uniformly throughout the second layer. In some embodiments, the second layer may not comprise droplets dispersed within the second layer. In some embodiments, the second layer may be optically transparent (e.g., clear). In some embodiments, the first layer and/or the second layer resulting from mixing and allowing to separate an aqueous fluid and a composition comprising a first type of solvent (e.g., a terpene) and not comprising a second type of solvent (e.g., an aromatic ester) may be optically transparent (e.g., clear). In some embodiments, the first layer and/or the second layer resulting from mixing and allowing to separate an aqueous fluid and a composition comprising a first type of solvent (e.g., a terpene) and a second type of solvent (e.g., an aromatic ester) may comprise small (e.g., micron-sized) droplets dispersed within each layer. In some embodiments, a first composition comprising a first type of solvent (e.g., a terpene) and a second type of solvent (e.g., an aromatic ester) may separate from an aqueous environment at a significantly slower rate (e.g., 2 times slower, 3 times slower, etc.) than a second composition comprising a first type of solvent (e.g., a terpene) and not comprising a second type of solvent (e.g., an aromatic ester).

In some embodiments, the composition can be used to reduce residues of soil(s), e.g. kerogens, asphaltenes, paraffins, organic scale, and pipe dope, or combinations thereof. In some embodiments, the extent of residue reduction by the composition may be higher than expected based on the residue reduction performance of individual components of the composition.

In some embodiments, methods of using the composition may comprise a requirement for delivering the composition beneath an aqueous layer without mixing or other external force besides gravity. In some embodiments, the composition may be used in enhanced oil recovery well clean-up. In some embodiments, the composition may be used for cleaning oil spills by mobilizing oil to allow it to be removed. In other embodiments, the composition may be used for cementing, drilling muds, or applications with heavy brines. In some embodiments, the composition may be used to deliver additives below an aqueous layer. Non-limiting examples of additives include corrosion inhibitors, paraffin dispersants, and asphaltene dispersants. In some embodiments, the composition may be used to clean submerged oil from an oil spill, wherein a method of using the composition comprises delivering the composition below the surface of water to mobilize the oil. In some embodiments, a method of using the composition comprises cleaning storage tanks comprising hydrocarbons (e.g., crude oil, asphaltenes, and/or paraffins) and water, wherein the hydrocarbons are submerged beneath the water, by delivering the composition below the surface of the water.

In some embodiments, residue (e.g., asphaltenes, paraffins) dissolution performance by a composition may be measured. In some embodiments, residue dissolution may be accomplished by exposing the composition to residues with agitation for a period of time sufficient to attain a saturated solution of residues in the composition. In such embodiments, the period of time of agitation chosen is suitable to the amount of the composition and residues used. In some embodiments, the sufficiently agitated composition comprising residues may then be decanted. Measurement of residue dissolution performance may then be carried out using UV-Vis spectroscopy. In some embodiments, the decanted composition comprising residues may be diluted for this measurement if dilution is necessary to obtain a meaningful measurement.

In some embodiments, the residue (e.g., asphaltenes, paraffins) dissolution performance by a composition comprising a first type of solvent, a second type of solvent, and a surfactant may be unexpectedly higher than that determined based on a weighted average of: the residue dissolution performance of a first composition comprising the first type of solvent and the surfactant and not comprising the second type of solvent, and the residue dissolution performance of a second composition comprising the second type of solvent and the surfactant and not comprising the first type of solvent. In other words, in some embodiments, the first type of solvent and the second type of solvent may exhibit synergistic effect on residue dissolution performance (see e.g., Example 1 and Example 2).

For convenience, certain terms employed in the specification, examples, and appended claims are listed here.

Definitions of specific functional groups and chemical terms are described in more detail below. For purposes of this invention, the chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the present invention. Those of ordinary skill in the art will readily appreciate that analogous ratios are contemplated for more complex isomer mixtures.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1 to 20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

As used herein, the term "alkyl" is given its ordinary meaning in the art and refers to the radical of saturated aliphatic groups, including straight chain alkyl groups, branched-chain alkyl groups, cycloalkyl (alicyclic) groups, alkyl substituted cycloalkyl groups, and cycloalkyl substituted alkyl groups. In some embodiments, the alkyl group may be a lower alkyl group, e.g., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some embodiments, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3 to 10 carbon atoms in their ring structure, or 5, 6 or 7 carbon atoms in their ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "heteroalkyl" is given its ordinary meaning in the art and refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, alkoxyalkyl, amino, thioester, poly(ethylene glycol), and alkyl-substituted amino.

The terms "alkenyl" and "alkynyl" are given their ordinary meaning in the art and refer to unsaturated aliphatic groups analogous in length and possible substitution to the alkyls described above, but that contain at least one double or triple bond respectively.

In certain embodiments, the alkyl, alkenyl and alkynyl groups employed in the invention contain 1 to 20 aliphatic carbon atoms. In certain other embodiments, the alkyl, alkenyl, and alkynyl groups employed in the invention contain 1 to 10 aliphatic carbon atoms. In yet other embodiments, the alkyl, alkenyl, and alkynyl groups employed in the invention contain 1 to 8 aliphatic carbon atoms. In still other embodiments, the alkyl, alkenyl, and alkynyl groups employed in the invention contain 1 to 6 aliphatic carbon atoms. In yet other embodiments, the alkyl, alkenyl, and alkynyl groups employed in the invention contain 1 to 4 carbon atoms. Illustrative aliphatic groups thus include, but are not limited to, for example, methyl, ethyl, n-propyl, isopropyl, allyl, n-butyl, sec-butyl, isobutyl, t-butyl, n-pentyl, sec-pentyl, isopentyl, t-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

The term "cycloalkyl," as used herein, refers specifically to groups having three to ten, preferably three to seven carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or hetercyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R^x$; —$CO_2(R^x)$; —$CON(R^x)_2$; —$OC(O)R^x$; —$OCO_2R^x$; —$OCON(R^x)_2$; —$N(R^x)_2$; —$S(O)_2R^x$; —$NR^x(CO)R^x$, wherein each occurrence of $R^x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic," as used herein, refers to an aliphatic moiety, as defined herein, which includes both saturated and unsaturated, nonaromatic, straight chain (i.e., unbranched), branched, acyclic, cyclic (i.e., heterocyclic), or polycyclic hydrocarbons, which are optionally substituted with one or more functional groups, and that contain one or more oxygen, sulfur, nitrogen, phosphorus, or silicon atoms, e.g., in place of carbon atoms. In certain embodiments, heteroaliphatic moieties are substituted by independent replacement of one or more of the hydrogen atoms thereon with one or more substituents. As will be appreciated by one of ordinary skill in the art, "heteroaliphatic" is intended herein to include, but is not limited to, heteroalkyl, heteroalkenyl, heteroalkynyl, heterocycloalkyl, heterocycloalkenyl, and heterocycloalkynyl moieties. Thus, the term "heteroaliphatic" includes the terms "heteroalkyl," "heteroalkenyl", "heteroalkynyl", and the like. Furthermore, as used herein, the terms "heteroalkyl", "heteroalkenyl", "heteroalkynyl", and the like encompass both substituted and unsubstituted groups. In certain embodiments, as used herein, "heteroaliphatic" is used to indicate those heteroaliphatic groups (cyclic, acyclic, substituted, unsubstituted, branched or unbranched) having 1 to 20 carbon atoms. Heteroaliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, sulfinyl, sulfonyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The terms "heteroalkenyl" and "heteroalkynyl" are given their ordinary meaning in the art and refer to unsaturated aliphatic groups analogous in length and possible substitution to the heteroalkyls described above, but that contain at least one double or triple bond respectively.

Some examples of substituents of the above-described aliphatic (and other) moieties of compounds of the invention include, but are not limited to aliphatic; heteroaliphatic; aryl; heteroaryl; alkylaryl; alkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CHF$_2$; —CH$_2$F; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$^x$; —CO$_2$(R$^x$); —CON(R$^x$)$_2$; —OC(O)R$^x$; —OCO$_2$R$^x$; —OCON(R$^x$)$_2$; —N(R$^x$)$_2$; —S(O)$_2$R$^x$; —NR$^x$(CO)R$^x$ wherein each occurrence of R$^x$ independently includes, but is not limited to, aliphatic, alycyclic, heteroaliphatic, heterocyclic, aryl, heteroaryl, alkylaryl, or alkylheteroaryl, wherein any of the aliphatic, heteroaliphatic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

As used herein, the term "aromatic" is given its ordinary meaning in the art and refers to aromatic carbocyclic groups, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls.

As used herein, the term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substituents, e.g., the substituents recited for aliphatic moieties, or for other moieties as disclosed herein, resulting in the formation of a stable compound. In some embodiments, an aryl group is a stable monocyclic or polycyclic unsaturated moiety having preferably 3 to 14 carbon atoms, each of which may be substituted or unsubstituted.

The term "heterocycle" is given its ordinary meaning in the art and refers to cyclic groups containing at least one heteroatom as a ring atom, in some embodiments, 1 to 3 heteroatoms as ring atoms, with the remainder of the ring atoms being carbon atoms. Suitable heteroatoms include oxygen, sulfur, nitrogen, phosphorus, and the like. In some embodiments, the heterocycle may be 3-membered to 10-membered ring structures or 3-membered to 7-membered rings, whose ring structures include one to four heteroatoms. The term "heterocycle" may include heteroaryl groups, saturated heterocycles (e.g., cycloheteroalkyl) groups, or combinations thereof. The heterocycle may be a saturated molecule, or may comprise one or more double bonds. In some embodiments, the heterocycle is a nitrogen heterocycle, wherein at least one ring comprises at least one nitrogen ring atom. The heterocycles may be fused to other rings to form a polycylic heterocycle. The heterocycle may also be fused to a spirocyclic group. In some embodiments, the heterocycle may be attached to a compound via a nitrogen or a carbon atom in the ring.

Heterocycles include, e.g., thiophene, benzothiophene, thianthrene, furan, tetrahydrofuran, pyran, isobenzofuran, chromene, xanthene, phenoxathiin, pyrrole, dihydropyrrole, pyrrolidine, imidazole, pyrazole, pyrazine, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, triazole, tetrazole, oxazole, isoxazole, thiazole, isothiazole, phenanthridine, acridine, pyrimidine, phenanthroline, phenazine, phenarsazine, phenothiazine, furazan, phenoxazine, pyrrolidine, oxolane, thiolane, oxazole, oxazine, piperidine, homopiperidine (hexamnethyleneimine), piperazine (e.g., N-methyl piperazine), morpholine, lactones, lactams such as azetidinones and pyrrolidinones, sultams, sultones, other saturated and/or unsaturated derivatives thereof, and the like. The heterocyclic ring can be optionally substituted at one or more positions with such substituents as described herein. In some embodiments, the heterocycle may be bonded to a compound via a heteroatom ring atom (e.g., nitrogen). In some embodiments, the heterocycle may be bonded to a compound via a carbon atom. In some embodiments, the heterocycle is pyridine, imidazole, pyrazine, pyrimidine, pyridazine, acridine, acridin-9-amine, bipyridine, naphthyridine, quinoline, benzoquinoline, benzoisoquinoline, phenanthridine-1,9-diamine, or the like.

The term "heteroaryl" is given its ordinary meaning in the art and refers to aryl groups comprising at least one heteroatom as a ring atom. A "heteroaryl" is a stable heterocyclic or polyheterocyclic unsaturated moiety having preferably 3 to 14 carbon atoms, each of which may be substituted or unsubstituted. Substituents include, but are not limited to, any of the previously mentioned substituents, e.g., the substituents recited for aliphatic moieties, or for other moieties as disclosed herein, resulting in the formation of a stable compound. In some embodiments, a heteroaryl is a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, e.g., pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some embodiments, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful for the formation of an imaging agent or an imaging agent precursor.

The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of optional substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —$CN$, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like.

EXAMPLES

These and other aspects of the present invention will be further appreciated upon consideration of the following Examples, which are intended to illustrate certain particular embodiments of the invention but are not intended to limit its scope, as defined by the claims.

Example 1

The following non-limiting example describes efficacy studies on an exemplary composition comprising technical grade d-limonene, benzyl benzoate, and a castor oil ethoxylate. The efficacy studies examined the ability of a composition to pass through an aqueous layer and to dissolve asphaltenes.

An exemplary composition was prepared, hereafter referred to as Composition A, consisting of 69.7 wt % benzyl benzoate, 29.8 wt % technical grade d-limonene, and 0.5 wt % castor oil ethoxylate with 40 ethylene oxide units (40 EO). The density of the composition was 1.02 g/mL at 25 degrees Celsius, as measured by an oscillating U-tube density meter.

To determine whether or not the composition would pass through an aqueous layer, a plastic pipette was used to gently drop the liquid composition at the top of the aqueous layer. Visual observation was used to determine that the drop sank.

Asphaltene dissolution performance was measured by exposing 20 mL of the composition to a surface of asphaltenes 28 mm in diameter in an 11-dram vial with agitation for 5 minutes to form a solution. After 5 minutes, a portion of the solution was decanted. UV-Vis spectroscopy was used to determine the amount of asphaltenes dissolved in the decanted solution by measuring the absorbance at 400 nm. If necessary, the solution comprising asphaltenes was diluted to more accurately determine this measurement.

This test showed asphaltene dissolution performance when using Composition A, a composition comprising benzyl benzoate and d-limonene, as shown in Table 1. Recall that Composition A included 69.7 wt % benzyl benzoate, 29.8 wt % technical grade d-limonene, and 0.5 wt % castor oil ethoxylate with 40 ethylene oxide units (40 EO). The calculated anticipated asphaltene dissolution performance of Composition A was determined by a weighted average performance of Composition B and Composition C, given that composition B and Composition C can be combined in a 3:7 weight ratio of B:C in order to obtain Composition A.

TABLE 1

Asphaltene Dissolution Performance of a Composition Comprising a Solvent Blend of Benzyl Benzoate and Technical Grade d-Limonene

| Composition | d-Limonene (wt %) | Benzyl Benzoate (wt %) | Castor Oil Ethoxylate Surfactant (wt %) | Calculated Anticipated Asphaltene Dissolution Performance (g/L) | Asphaltene Dissolution Performance (g/L) |
|---|---|---|---|---|---|
| A | 29.8 | 69.7 | 0.5 | 11 | 17 |
| B | 99.5 | 0 | 0.5 | Not Applicable | 36 |
| C | 0 | 99.5 | 0.5 | Not Applicable | 0.5 |

This example demonstrated that an exemplary composition comprising technical grade d-limonene, benzyl benzoate, and a castor oil ethoxylate passed through an aqueous layer and dissolved asphaltene.

Example 2

The following non-limiting example describes efficacy studies on exemplary compositions comprising technical grade d-limonene, methyl salicylate, and a castor oil ethoxylate. The efficacy studies examined the ability of each composition to pass through an aqueous layer, to dissolve asphaltenes, and to dissolve paraffins.

An exemplary first composition was prepared, hereafter referred to as Composition D, comprising 54.8 wt % methyl salicylate, 44.7 wt % technical grade d-limonene, and 0.5 wt % castor oil ethoxylate with 40 ethylene oxide units (40 EO). The density of the composition was 0.99 g/mL at 25 degrees Celsius, as measured by an oscillating U-tube density meter. An exemplary second composition was prepared, hereafter referred to as Composition F, comprising by weight 69.7 wt % methyl salicylate, 29.8 wt % technical grade d-limonene, and 0.5 wt % castor oil ethoxylate with 40 ethylene oxide units (40 EO). The density of the composition was 1.05 g/mL, as measured by an oscillating U-tube density meter.

To determine whether or not the compositions would pass through an aqueous layer, a plastic pipette was used to gently drop a given liquid composition at the top of the aqueous layer. Visual observation was used to determine that drops of both compositions sank.

Asphaltene dissolution performance was measured using the method described in Example 1. This test showed asphaltene dissolution performance when using Composition D and Composition F comprising methyl salicylate and d-limonene, as shown in Table 2. The calculated anticipated asphaltene dissolution performance of Composition D was determined by a weighted average performance of Composition B and Composition G, given that composition B and Composition G can be combined in a 9:11 weight ratio of B:G in order to obtain Composition D. The calculated anticipated asphaltene dissolution performance of Composition F was determined by a weighted average performance of Composition B and Composition G, given that composition B and Composition G can be combined in a 3:7 weight ratio of B:G in order to obtain Composition F.

TABLE 2

Asphaltene Dissolution Performance of a Composition Comprising a Solvent Blend of Methyl Salicylate and Technical Grade d-Limonene

| Composition | d-Limonene (wt %) | Methyl Salicylate (wt %) | Castor Oil Ethoxylate Surfactant (wt %) | Calculated Anticipated Asphaltene Dissolution Performance (g/L) | Asphaltene Dissolution Performance (g/L) |
|---|---|---|---|---|---|
| D | 44.7 | 54.8 | 0.5 | 27.9 | 33 |
| F | 29.8 | 69.7 | 0.5 | 23.95 | 35 |
| B | 99.5 | 0 | 0.5 | Not Applicable | 42.5 |
| G | 0 | 99.5 | 0.5 | Not Applicable | 16 |

Paraffin dissolution performance was measured by exposing 20 mL of the composition to a surface of paraffins 28 mm in diameter in an 11-dram vial with agitation for 5 minutes to form a solution. After 5 minutes, a portion of the solution was decanted. UV-Vis spectroscopy was used to determine the amount of paraffins dissolved in the decanted solution by measuring the absorbance at 400 nm. If necessary, the solution comprising paraffins was diluted to more accurately determine this measurement. The results are shown in Table 3.

TABLE 3

Paraffin Dissolution Performance of a Composition Comprising a Solvent Blend of Methyl Salicylate and Technical grade d-Limonene

| Composition | d-Limonene (wt %) | Methyl Salicylate (wt %) | Castor Oil Ethoxylate Surfactant (wt %) | Paraffin Dissolution Performance (wt %) |
|---|---|---|---|---|
| D | 44.7 | 54.8 | 0.5 | 29.5 |
| F | 29.8 | 69.7 | 0.5 | 19.5 |
| B | 99.5 | 0 | 0.5 | 65 |

This example demonstrated that each of two exemplary compositions comprising technical grade d-limonene, methyl salicylate, and a castor oil ethoxylate passed through an aqueous layer, dissolved asphaltene, and dissolved paraffins.

Example 3

The following non-limiting example describes the separation behavior from an aqueous environment of compositions comprising a terpene, an aromatic ester solvent, and a nonionic surfactant.

To determine rate of separation of a composition from an aqueous environment, a composition was combined with water or brine in a 15 mm by 125 mm tube and shaken vigorously for 30 seconds. The shaken sample was then allowed to separate, and the time was recorded. One experiment was done comparing d-limonene (with a density of 0.84 g/mL) to a composition with a density of 0.98 g/mL in deionized water. The composition took 5 minutes and 33 seconds to separate, and both layers (e.g., the composition layer and the aqueous layer) still contained small droplets dispersed uniformly throughout. Neat d-limonene separated in 2 minutes and 30 seconds, and both layers (e.g., the d-limonene layer and the aqueous layer) were clear.

Another experiment compared d-limonene (with a density of 0.84 g/mL) to a composition with a density of 1.05 g/mL in a brine (API 12) with a density of 1.08 g/mL. The composition took 1 minute and 54 seconds to separate and small droplets remained dispersed in the top layer (e.g., the composition layer). Neat d-limonene separated in 54 seconds, and both layers (e.g., the d-limonene layer and the aqueous layer) were clear. This example demonstrated that each exemplary composition comprising a terpene, an aromatic ester solvent, and a nonionic surfactant required a much greater time for the composition to separate from the aqueous layer than did the terpene alone, which behavior improves the reduction of residues on a wellbore or near a wellbore comprising an aqueous layer.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g. elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g. the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element or a list of elements. In general, the term "or" as used herein shall only be interpreted as indicating exclusive alternatives (e.g. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "between" in reference to a range of elements or a range of units should be understood to include the lower and upper range of the elements or the lower and upper range of the units, respectively. For example, the phrase describing a molecule having "between 6 to 12 carbon atoms" should mean a molecule that may have, e.g., from 6 carbon atoms to 12 carbon atoms, inclusively. For example, the phrase describing a composition comprising "between about 5 wt % and about 40 wt % surfactant" should mean the composition may have, e.g., from about 5 wt % to about 40 wt % surfactant, inclusively.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, e.g. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition for treating an oil and/or gas well having a wellbore, comprising:
   from about 90 wt % to about 99.9 wt % of a solvent blend versus the total weight of the composition, wherein the solvent blend comprises:
      a terpene;
      an amine solvent; and
      a non-halogenated solvent; and
   from about 0.1 wt % to about 10 wt % of one or more surfactants versus the total weight of the composition;
   wherein the density of the composition is at least 1.05 g/ml.

2. The composition of claim 1, wherein the terpene is selected from the group consisting of d-limonene, dipentene, alpha terpineol, alpha pinene, beta pinene, and eucalyptol.

3. The composition of claim 1, wherein the non-halogenated solvent comprises a non-halogenated aromatic ester solvent.

4. The composition of claim 3, wherein the non-halogenated aromatic ester solvent comprises an ester of salicylates.

5. The composition of claim 1, wherein the solvent blend further comprises butyl 3-hydroxybutanoate.

6. The composition of claim 1, wherein the one or more surfactants comprise nonionic surfactants.

7. The composition of claim 6, wherein the nonionic surfactants are selected from the group consisting of ethoxylated castor oils, ethoxylated sorbitan esters, ethoxylated alcohols, ethoxylated tristyrylphenols, ethoxylated fatty acids, ethoxylated fatty amides, and sorbitan esters.

8. The composition of claim 1, wherein the terpene is present in an amount from about 1 wt % to about 50 wt % versus the total weight of the composition.

9. The composition of claim 1, wherein the non-halogenated solvent is present in an amount from about 40 wt % to about 98.9 wt % versus the total weight of the composition.

10. The composition of claim 1, wherein the one or more surfactants is present in an amount from about 0.1 wt % to about 2 wt % versus the total weight of the composition.

11. The composition of claim 1, wherein the composition is free of any solid additives.

12. The composition of claim 1, wherein the composition is free of any emulsified additives.

13. A method of treating an oil and/or gas well having a wellbore, wherein the wellbore comprises one or more fluids, comprising:
 delivering a composition into the wellbore, wherein the composition comprises:
  from about 90 wt % to about 99.9 wt % of a solvent blend versus the total weight of the composition, wherein the solvent blend comprises:
   a terpene;
   an amine solvent; and
   a non-halogenated solvent; and
  from about 0.1 wt % to about 10 wt % of one or more surfactants versus the total weight of the composition; and wherein the density of the composition is at least 1.05 g/ml; and
 causing the composition to travel through the one or more fluids to reduce residues on the wellbore or near the wellbore.

14. The method of claim 13, wherein the residues are selected from the group consisting of kerogens, asphaltenes, paraffins, and organic scale.

15. The method of claim 13, wherein the non-halogenated solvent comprises a non-halogenated aromatic ester solvent.

16. The method of claim 13, wherein the terpene is selected from the group consisting of d-limonene, dipentene, alpha terpineol, alpha pinene, beta pinene, and eucalyptol.

17. The method of claim 15, wherein the non-halogenated aromatic ester solvent comprises an ester of a salicylates.

18. The method of claim 13, wherein the solvent blend further comprises butyl 3-hydroxybutanoate.

19. The method of claim 13, wherein the one or more surfactants comprise nonionic surfactants.

20. The method of claim 19, wherein the nonionic surfactants are selected from the group consisting of ethoxylated castor oils, ethoxylated sorbitan esters, ethoxylated alcohols, ethoxylated tristyrylphenols, ethoxylated fatty acids, ethoxylated fatty amides, and sorbitan esters.

21. The method of claim 13, wherein the terpene is present in an amount from about 1 wt % to about 50 wt % versus the total weight of the composition.

22. The method of claim 13, wherein the non-halogenated solvent is present in an amount from about 40 wt % to about 98.9 wt % versus the total weight of the composition.

23. The method of claim 13, wherein the one or more surfactants is present in an amount from about 0.1 wt % to about 2 wt % versus the total weight of the composition.

24. The method of claim 13, wherein the composition is free of any solid additives.

25. The method of claim 13, wherein the composition is free of any emulsified additives.

26. The composition of claim 3, wherein the non-halogenated aromatic ester solvent comprises an ester of a benzoate.

27. The composition of claim 3, wherein the non-halogenated aromatic ester solvent comprises an ester of a cinnamate.

28. The composition of claim 3, wherein the non-halogenated aromatic ester solvent comprises an ester of a phthalate.

29. The method of claim 15, wherein the non-halogenated aromatic ester solvent comprises an ester of a benzoate.

30. The method of claim 15, wherein the non-halogenated aromatic ester solvent comprises an ester of a cinnamate.

31. The method of claim 15, wherein the non-halogenated aromatic ester solvent comprises an ester of a phthalate.

* * * * *

UNITED STATES PATENT AND TRADEMARK OFFICE
CERTIFICATE OF CORRECTION

PATENT NO. : 10,934,472 B2
APPLICATION NO. : 15/680454
DATED : March 2, 2021
INVENTOR(S) : Richard Harlen Smith, Jr.

It is certified that error appears in the above-identified patent and that said Letters Patent is hereby corrected as shown below:

In the Claims

Column 36, Claim 4, Line 54-55, "of salicylates" should be "of a salicylate"

Column 37, Claim 17, Line 38, "of a salicylates" should be "of a salicylate"

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*